(12) United States Patent
De Smet et al.

(10) Patent No.: US 10,378,404 B2
(45) Date of Patent: Aug. 13, 2019

(54) METHODS AND SYSTEMS FOR AN ENGINE AFTER-TREATMENT SYSTEM

(71) Applicant: Ford Global Technologies, LLC, Dearborn, MI (US)

(72) Inventors: Frederik De Smet, Genk (BE); Christoph Boerensen, Aachen (DE); Frank Linzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/488,260

(22) Filed: Apr. 14, 2017

(65) Prior Publication Data

US 2017/0314439 A1 Nov. 2, 2017

(30) Foreign Application Priority Data

Apr. 27, 2016 (IN) .............................. 201641014703

(51) Int. Cl.
*F01N 3/02* (2006.01)
*F01N 3/20* (2006.01)
*F01N 11/00* (2006.01)
*F01N 13/00* (2010.01)
*F01N 3/08* (2006.01)

(52) U.S. Cl.
CPC ........... *F01N 3/206* (2013.01); *F01N 3/0814* (2013.01); *F01N 3/0842* (2013.01); *F01N 11/00* (2013.01); *F01N 13/0093* (2014.06); *F01N 2430/06* (2013.01); *F01N 2550/03* (2013.01); *F01N 2560/025* (2013.01); *F01N 2610/03* (2013.01);

(Continued)

(58) Field of Classification Search
CPC .... F01N 13/009; F01N 13/0093; F01N 11/00; F01N 3/0814; F01N 3/0842; F01N 3/0821; F01N 3/206; F01N 2430/06; F01N 2550/03; F01N 2560/025; F01N 2610/03; F01N 2900/1402; Y02T 10/24; Y02T 10/47
USPC ................. 60/274, 276, 277, 285, 286, 295, 60/299–301
See application file for complete search history.

(56) References Cited

U.S. PATENT DOCUMENTS 6,615,580 B1 9/2003 Khair et al.
7,082,753 B2 8/2006 Dalla Betta et al.
(Continued)

FOREIGN PATENT DOCUMENTS

DE 102012218728 A1 7/2013
DE 102016200155 A1 7/2016
DE 102015206838 A1 10/2016

*Primary Examiner* — Patrick D Maines
*Assistant Examiner* — Dapinder Singh
(74) *Attorney, Agent, or Firm* — Julia Voutyras; McCoy Russell LLP

(57) ABSTRACT

The present subject matter relates to a method and a treatment system monitor for monitoring an engine exhaust after-treatment system containing more than one Lean $NO_x$ Traps (LNT). The method includes receiving an exhaust gas of a desired air-fuel ratio upstream of a respective LNT. The LNT is further regenerated using a richer than stoichiometric exhaust air-fuel ratio and subsequently an air-fuel ratio received downstream of the LNT is evaluated. Further, a working state of a respective LNT is determined based on the monitoring of the air-fuel ratio and oxygen level upstream and downstream of the LNT.

18 Claims, 7 Drawing Sheets

(52) U.S. Cl.
    CPC ....... *F01N 2900/1402* (2013.01); *Y02T 10/24* (2013.01); *Y02T 10/47* (2013.01)

(56) References Cited

U.S. PATENT DOCUMENTS

| | | |
|---|---|---|
| 8,225,600 B2 | 7/2012 | Theis |
| 8,661,791 B2 * | 3/2014 | Furness ................ F01N 3/0842 60/274 |
| 2015/0000255 A1 * | 1/2015 | Harmsen ............... F01N 3/0821 60/274 |
| 2015/0238903 A1 | 8/2015 | Mital et al. |
| 2016/0003123 A1 | 1/2016 | Giordano et al. |

* cited by examiner

METHODS AND SYSTEMS FOR AN ENGINE AFTER-TREATMENT SYSTEM

CROSS REFERENCE TO RELATED APPLICATION

The present application claims priority to Indian Patent Application No. 201641014703, filed on Apr. 27, 2016. The entire contents of the above-referenced application are hereby incorporated by reference in its entirety for all purposes.

FIELD

The present description relates generally to system and methods for diagnostics of an exhaust after-treatment system comprising a plurality of lean NOx traps.

BACKGROUND/SUMMERY

Internal combustion (IC) engines are typically coupled to an emission control device to reduce combustion by-products such as carbon monoxide (CO), hydrocarbon (HC) and oxides of nitrogen ($NO_x$). For lean engine operation of the IC engine, a lean $NO_x$ Trap (LNT) can be coupled to the emission control device for reduce exhaust NOx emissions. The LNT stores exhaust components, such as oxygen and NOx, during the lean operation. When the quantity of $NO_x$ stored in the LNT exceeds a predetermined threshold value, the LNT undergoes a regeneration process, also referred to as $DeNO_x$ regeneration or a purge, the purpose of which is to reduce the nitrogen oxides ($NO_x$) that have accumulated in the LNT. Once the purge is completed, the lean engine operation may resume again. Therefore, the LNT stores exhaust emissions such as, for example, oxidants, during the operation of the engine at a lean air-fuel ratio, and releases and purges the exhaust emissions when the engine is operating at a richer than stoichiometric or stoichiometric air-fuel ratio.

In the current scenario, environmental protection regulations demand that the performance of the LNT is being monitored periodically to prevent excessive $NO_x$ emissions. If the LNT deteriorates over time, the ability to trap NOx degrades with a resultant increase in atmospheric emissions. Therefore, it is desirable to monitor the LNT for providing an indication of deterioration or degradation of the LNT beyond a predetermined limit.

An exemplary system for monitoring a LNT is described in US Patent Publication US20160003123 A1 ('123 publication). The '123 publication describes an electronic control module for operating an IC engine. The electronic control module is configured to monitor a first air-fuel equivalence ratio of engine exhaust gases upstream of a $NO_x$ trap, and to activate a diagnostic routine for the $NO_x$ trap when the first air-fuel equivalence ratio is smaller than one. The diagnostic routine enables the electronic control module to monitor a second air-fuel equivalence ratio of engine exhaust gases downstream of the $NO_x$ trap, to use the first and second air-fuel equivalence ratios to calculate an index that is representative of the conversion efficiency of the $NO_x$ trap, and to identify a degradation of the $NO_x$ trap when the efficiency index is lower than a predetermined threshold value. The '123 publication describes a mechanism which allows $NO_x$ trap monitoring using fuel efficient regeneration, in which the fuel efficient regeneration is activated for monitoring one $NO_x$ trap. However, the inventors herein have recognized potential disadvantages with the above approach. In one example, in cases where an engine exhaust after-treatment system has more than one $NO_x$ trap, then each of the $NO_x$ traps need monitoring. As a consequence, a desired rich air-fuel mixture purges may need to be triggered periodically for each NOx trap. The system and method described in the '123 publication does not enable adjusting an air-fuel ratio of exhaust entering a second (or subsequent) NOx trap positioned downstream of a first NOx trap. Therefore, it may not be possible to simultaneously monitor operation of a plurality of NOx traps.

In one example, the issues described above may be addressed by a method comprising: receiving a first exhaust gas of a desired air-fuel ratio upstream of a first lean $NO_x$ trap (LNT); initiating a richer than stoichiometric regeneration of the first LNT for obtaining a second exhaust gas downstream of the first LNT; evaluating an air-fuel ratio of the second exhaust gas received downstream of the first LNT; in response to the evaluated air-fuel ratio of the second exhaust gas being higher than the desired air-fuel ratio, activating injection of a vaporized reductant by an injector disposed downstream of the first LNT to the second exhaust gas for obtaining the desired air-fuel ratio of the second exhaust gas, where the injector is a vaporizer; receiving the second exhaust gas of the desired air-fuel ratio upstream of the second LNT; initiating a richer than stoichiometric regeneration of the second LNT for obtaining a third exhaust gas downstream of the second LNT; evaluating an air-fuel ratio of the third exhaust gas received downstream of the second LNT; and determining a working state of each of the first LNT and the second LNT based on each of the desired air-fuel ratio of the first exhaust gas, the evaluated air-fuel ratio of the second exhaust gas, and the evaluated air-fuel ratio of the third exhaust gas. In this way, by adjusting air-fuel ratio of exhaust entering a plurality of LNTs, diagnostics of each LNT may be carried out simultaneously.

The present summary is provided to introduce concepts related to monitoring of an engine exhaust after-treatment system. The concepts are further described below in the detailed description. In one implementation, a method for monitoring an engine exhaust after-treatment system with more than one LNT is described. To this end, the method utilizes a system to perform all steps described below for monitoring the exhaust gas after-treatment system. For monitoring the exhaust gas after-treatment system, a first exhaust gas of a desired first air-fuel ratio is received upstream of a first lean $NO_x$ trap (LNT). Once received, a richer than stoichiometric regeneration of the first LNT is initiated for obtaining a second exhaust gas with an air-fuel ratio downstream of the first LNT. The air-fuel ratio of the second exhaust gas received downstream of the first LNT is monitored to check whether the air-fuel ratio of the second exhaust gas is one of lean of stoichiometry, stoichiometric, and rich of stoichiometry. When the air-fuel ratio downstream of the first LNT is higher than the desired air-fuel ratio, a vaporized reductant injection to the second exhaust gas is activated by an injector such as a vaporizer disposed downstream of the first LNT. After the vaporized reductant (such as fuel) injection, a well-controlled (desired) air-fuel ratio of the second exhaust gas downstream of the first LNT is obtained. Further, the air fuel ratio of the second exhaust gas is well-controlled in terms of stability and their threshold value. In one example, the desired air-fuel ratio is at least one of a stoichiometric and an under-stoichiometric ratio.

Further, the second exhaust gas of a desired air-fuel ratio is received upstream of the second LNT, which is coupled downstream of the first LNT. Further, a richer than stoichiometric regeneration of the second LNT is initiated. Once the second LNT is regenerated, a third exhaust gas of a third air-fuel ratio received downstream of the second LNT is evaluated. Finally, based on the evaluation of the air-fuel ratios upstream and downstream of that LNT, a working state of a respective LNT is determined. In one example, the air-fuel ratio monitored downstream of respective LNT may be compared with a predefined threshold value. Based on the comparison, the working state of the LNT can be determined.

Thus, by applying the previously described method, more than one LNT can be monitored simultaneously using a single purge and therefore minimizing the fuel consumption. Additionally, the method utilizes the single purge for monitoring of the subsequent LNTs by injecting the vaporized reductant to the exhaust gas upstream of the subsequent LNT in order to bring the air fuel ratio of the exhaust gas to a desired air-fuel ratio to perform subsequent purging, therefore ensuring efficient monitoring of the plurality of LNTs using minimized quantity of fuel. By vaporizing the reductant, a smaller quantity of fuel may be used to achieve the desired air-fuel ratio upstream of the second LNT within a shorter duration, thereby facilitating simultaneous regeneration and diagnostics of the two consecutive LNTs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
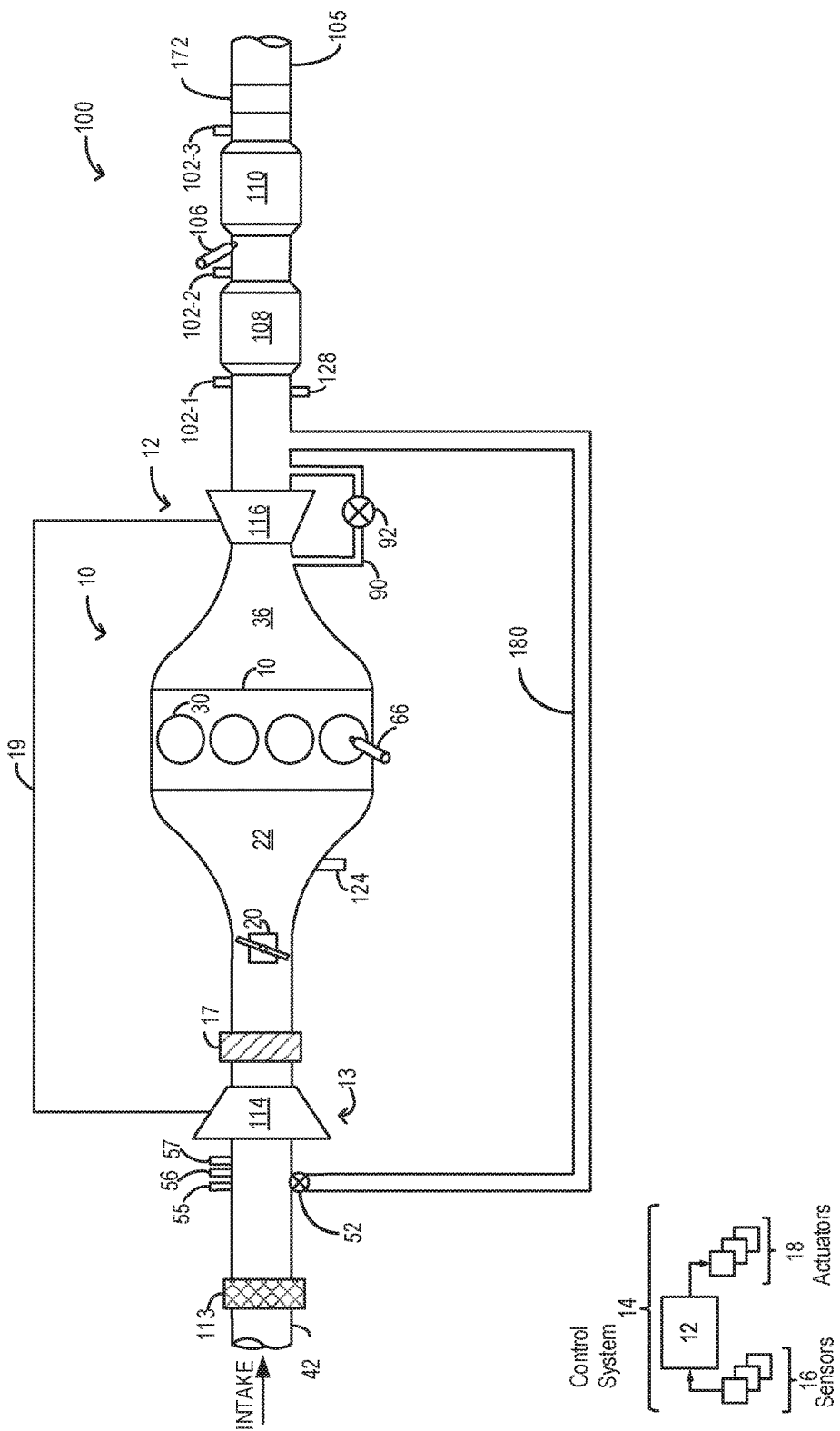
FIG. 1 shows an example embodiment of an engine system including an engine exhaust after-treatment system.

The following description relates to systems and methods for diagnostics of an exhaust after-treatment system. The exhaust after-treatment system may include two lean NOx traps (LNTs) arranged in series in an exhaust passage. Each LNT may trap engine-out NOx that is generated during combustion. When an LNT has reached NOx storage capacity, a purge of the stored NOx may be carried out by providing exhaust gas having relatively rich air-fuel ratio to the LNT. Further, an aging or degradation state of the LNT may be determined by monitoring NOx slip out of the LNT and/or by monitoring oxygen storage immediately following a purge.

The rich purge described above may be achieved by operating the engine with rich air-fuel ratio for a duration. The engine air-fuel ratio may be maintained within a relatively narrow desired range due to closed-loop feedback control of engine air-fuel ratio. As such, rich purge of an upstream LNT may be performed efficiently and with minimal fuel penalty. However, a downstream LNT (e.g., downstream of the upstream LNT) receives exhaust gas that has traveled through the upstream LNT, and thus the air-fuel ratio of the exhaust gas at the downstream LNT may leaner than desired for conducting a rich purge of the downstream LNT, in particular during a purge of the upstream LNT due to utilization of the excess hydrocarbons in the exhaust gas for reducing the stored NOx in the upstream LNT. Further, to perform LNT diagnostics by monitoring post-purge oxygen storage, a complete regeneration of the LNT may first be carried out, but the amount of reductants supplied to the downstream LNT is low and thus a complete regeneration may be relatively time consuming. Such lengthy purges may be difficult to achieve given driver requested torque changes. To address these issues, a purge and diagnostics of the downstream LNT may be carried out separately from a purge of the upstream LNT, but doing so imposes a large fuel penalty.

Thus, according to embodiments disclosed herein, purge and diagnostics of two or more LNTs may be carried out simultaneously by providing vaporized reductant to the downstream LNT(s). When engine and catalyst conditions are fullfilled, a rich regeneration may be triggered by switching the engine to burn understoechiometric (lambda<1). During the rich regeneration, the upstream lambda signal value of the first LNT is controlled by feedback of an oxygen sensor (e.g., fuel injection to the engine is controlled). During this rich purge, depending on entry conditions, the state of the catalyst may be monitored for its health. During the purge, the oxygen sensor signal downstream the first LNT will drop to one or below. When this signal crosses a threshold, for example lambda=1, vaporizer injection may be activated to supply vaporized reductant to the second LNT. The amount of vaporizer injection is controlled to satisfy a lambda target upstream the second LNT that fullfils the range to enable monitoring of the second LNT. When the lambda has reached its target value to satisfy monitoring entry conditions, a monitoring event may be started to evaluate the health of the second LNT.

In this way, monitoring of the aging of both LNTs may be carried out during one purge event, thus minimizing fuel penalty and increasing the occurance of such monitoring. In contrast, when two purges are carried out, during the second purge the oxygen stored on the first LNT needs to be consumed by the HC and CO supplied in the exhaust gas, before there is breakthrough to the second LNT. This is fuel not needed to be injected with the method proposed here.

The vaporizer adds the fuel in an amount based on the difference between the downstream first LNT lambda and the target lambda, whereby the downstream first LNT lambda during the rich regeneration is already <=1. This way, the amount of fuel to add is limited. With the two purges method, after the oxygen on the first LNT is consumed, the extra fuel to inject corresponds to the difference between the lean mode lambda and the target lambda, which is again bigger than the difference between a lambda already <=1 and the target lambda.

Figure 2:
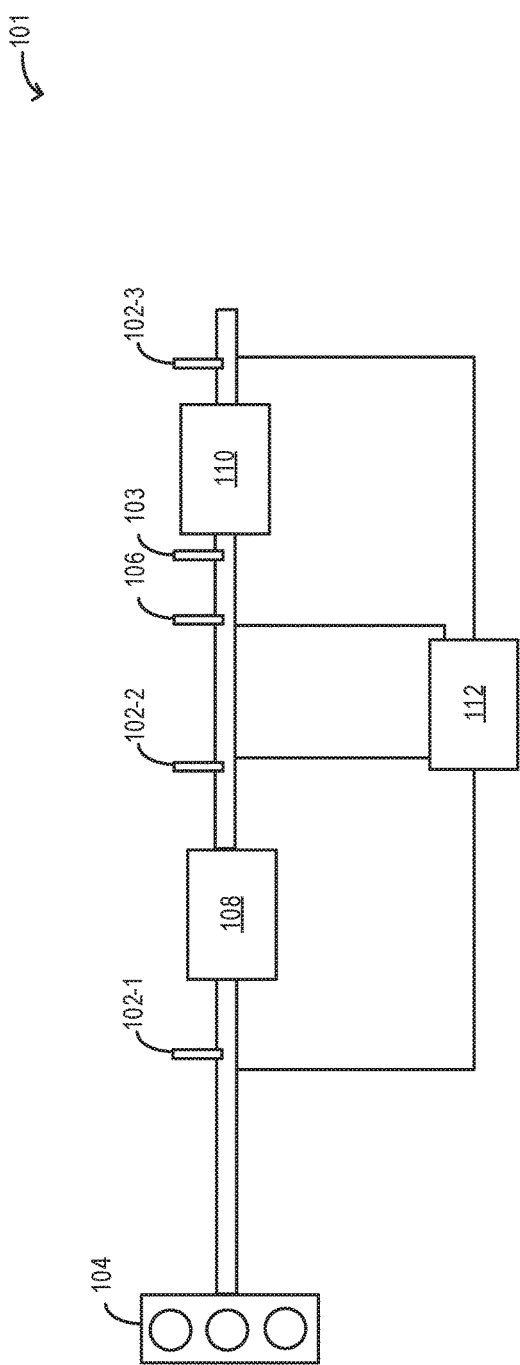
FIG. 2 illustrates a detailed example layout of the engine exhaust after-treatment system.
Figure 3:
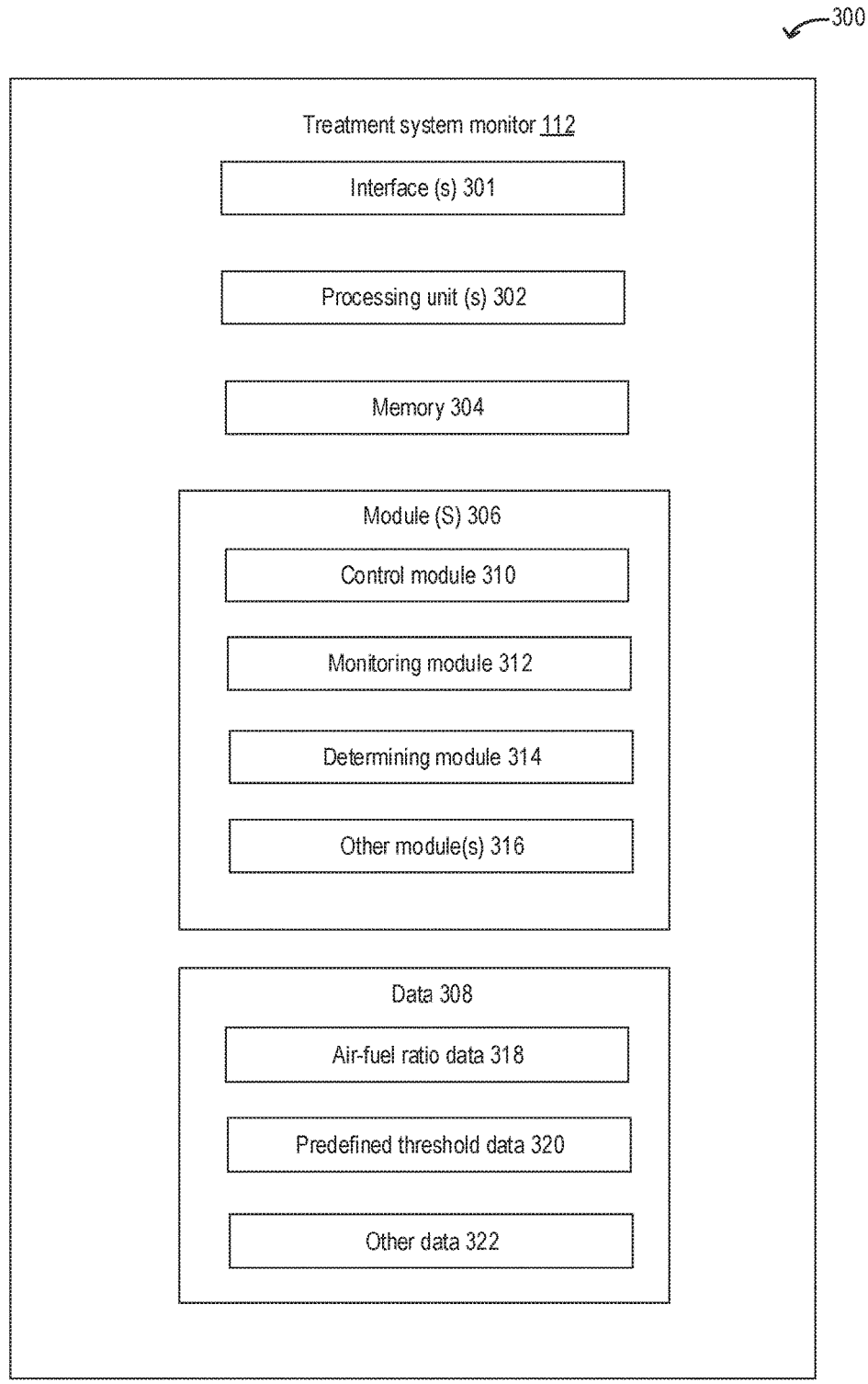
FIG. 3 illustrates a block diagram of a treatment system monitor for monitoring an engine exhaust after-treatment system, as per an example of the present subject matter.

An example engine system comprising an exhaust after-treatment system is shown in FIG. 1. Details of the exhaust after-treatment system including a first lean NOx trap and a second lean NOx trap (LNT) are shown in FIG. 2. A block diagram of a treatment system monitor for monitoring the diagnostics of the engine exhaust after-treatment system is shown in FIG. 3. An engine controller may be configured to perform control routines, such as the example routines of FIGS. 4, 5, and 6, for diagnostics of each of the first and the second LNTs of the exhaust after-treatment system. An example plot of air-fuel ratios upstream and downstream of the first LNT during a regeneration of the first LNT is shown in FIG. 7.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 113 and flows to compressor 114. The compressor may be any suitable intake air compressor, such as a motor-driven or driveshaft-driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, and exhaust residuals received at the compressor inlet.

A wastegate actuator 92 may be actuated open to dump at least some exhaust pressure from upstream of the turbine to a location downstream of the turbine via wastegate 90. Further, adjustments to the geometry of a variable geometry turbine (VGT) may be carried out to control mass air flow. By reducing exhaust pressure upstream of the turbine, turbine speed can be reduced, for boost control and/or to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The flow downstream of the turbine then flows sequentially through a first lean NOx trap (LNT) 108 and a second LNT 110, coupled to the exhaust passage 105. Each of the LNTs may be configured to catalytically treat the exhaust flow, and thereby reduce an amount of one or more substances (such as NOx produced during combustion) in the exhaust flow. For example, the LNTs may be configured to disproportionate $NO_x$ or to selectively reduce $NO_x$ with the aid of a reducing agent such as fuel, ammonia, or urea added to the exhaust. During leaner than stoichiometric engine operation, the LNTs may store oxidants such as NOx and during subsequent richer than stoichiometric operations, the NOx stored in the LNTs may be converted to nitrogen and water which may then be released to the atmosphere. Therefore for regeneration of the LNTs (removal of stored NOx), a richer than stoichiometric exhaust air-fuel ratio may be desired at each of the two LNT 108 and 110.

An injector 106 such as a vaporizer may be coupled to the exhaust passage 105 upstream of the second LNT 110 to inject a desired volume of vaporized reductant to the exhaust gas entering the second LNT 110. The vaporizer 106 may include a heating coil to vaporize the liquid fuel entering the vaporizer from the fuel tank (not shown) before the fuel (in gaseous state) is injected to the exhaust. During conditions such as when the first LNT is being regenerated, the air-fuel ratio of exhaust generated after combustion may be modified at the first LNT 108 and a richer than stoichiometric air-fuel ratio may not be available at the second LNT to enable regeneration of the second LNT 110. Therefore, in order to opportunistically adjust the air-fuel ratio of exhaust entering the second LNT 110 to a richer than stoichiometric ratio and to initiate a regeneration of the second LNT 108, vaporized reductant such as vaporized fuel may be injected to the exhaust gas. As the injected fuel is already vaporized (in gaseous state), additional time may not be required for vaporization any liquid fuel, and regeneration of the second LNT may be initiated without any time delay. Further, if liquid fuel is injected, a portion of fuel may not vaporize and may form a puddle in the exhaust passage. By injecting vaporized fuel, a smaller amount of fuel may be injected to attain a desired richer than stoichiometric air-fuel ratio of exhaust entering the second LNT 110.

A first exhaust gas temperature sensor 128 may be coupled to the exhaust passage 105 upstream of the first LNT device 108. Oxygens sensors suitable for providing an indication of exhaust gas air-fuel ratio such as linear oxygen sensors or UEGO (universal or wide-range exhaust gas oxygen), two-state oxygen sensors or EGO, HEGO (heated EGO), a NOx, HC, or CO sensors may also be coupled to the exhaust passage 105. A first oxygen sensor 102-1 may be coupled to the exhaust passage 105 upstream of the first LNT to measure the exhaust air-fuel ratio entering the first LNT 108. A second oxygen sensor 102-2 may be coupled to the exhaust passage 105 downstream of the first LNT 108 (upstream of the second LNT 110) to measure the exhaust air-fuel ratio exiting the first LNT 108 and entering the second LNT 110. A third oxygen sensor 102-3 may be coupled to the exhaust passage 105 downstream of the second LNT 110 to measure the exhaust air-fuel ratio exiting the second LNT 110.

Diagnostics of each of the first LNT 108 and the second LNT 110 may be opportunistically and concurrently carried out to detect any degradation of each of the LNTs. In one example, in response to a richer than stoichiometric measured first exhaust air-fuel ratio upstream of LNT 108 as measured via the first oxygen sensor 102-1, regeneration of the first LNT may be initiated. During regeneration of the first LNT, in response to the second exhaust air-fuel ratio being lower than a threshold (e.g. richer than stoichiometric), degradation of the first LNT may be indicated. In case of degradation of the first LNT, the hydrocarbons in the exhaust may not be effectively used for NOx conversion, and hence the air-fuel ratio of exhaust exiting the first LNT 108 may be richer than stoichiometric. In order to concurrently regenerate the second LNT 110, a richer than stoichiometric exhaust air-fuel ratio is desired at the second LNT 110. However, during regeneration of the first LNT 108, the air-fuel ratio of the exhaust exiting the first LNT 108 may not be richer as the hydrocarbon in the exhaust are used for treatment of NOx trapped in the first LNT 108. In response to a leaner than stoichiometric second exhaust air-fuel ratio upstream of a second LNT, a volume of vaporized reductant such as fuel may be injected to exhaust gas entering the second LNT 110 via the vaporizer 106 until the second exhaust air-fuel ratio decreases to a threshold air-fuel ratio, the threshold air-fuel ratio richer than stoichiometric. In one example, as the vaporized fuel in injected to the exhaust, the air-fuel ratio upstream of the second LNT 110 becomes richer than stoichiometric and only thereafter, regeneration of the second LNT 110 may be initiated. During regeneration of the second LNT, in response to the third exhaust air-fuel ratio downstream of the second LNT (as measured via the third oxygen sensor 102-3) being richer than the threshold, degradation of the second LNT may be indicated.

Further, if a LNT is degraded, the storage capability for oxidants such as NOx and oxygen may decrease. In one example, upon completion of regeneration of the first LNT, a first amount of oxygen stored in the first LNT may be measured within a threshold duration immediately after the completion of the regeneration of the first LNT, and in response to the first amount of oxygen stored in the first LNT being lower than a first threshold oxygen amount, degradation of the first LNT may be indicated. The first amount of oxygen stored in the first LNT 108 may be calculated based on the amount of oxygen entering the first LNT 108 as determined via inputs from the first oxygen sensor 102-1 and the amount of oxygen exiting the first LNT 108 as determined via inputs from the second oxygen sensor 102-2. Similarly, upon completion of regeneration of the second LNT, a second amount of oxygen stored in the second LNT may be measured within the threshold duration immediately after the completion of the regeneration of the second LNT, and in response to the second amount of oxygen stored in the second LNT being lower than a second threshold oxygen amount, degradation of the second LNT may be indicated, the first threshold oxygen amount higher than the second threshold oxygen amount. The second amount of oxygen stored in the second LNT 110 may be calculated based on the amount of oxygen entering the second LNT 110 as determined via inputs from the second oxygen sensor 102-2 and the amount of oxygen exiting the second LNT 110 as determined via inputs from the third oxygen sensor 102-3.

In response to an indication of degradation of at least one of the first LNT 108 and the second LNT 110, a diagnostic code may be set and one or more engine operating parameters may be adjusted. In one example, engine load may be limited to below a threshold engine load by reducing an opening of an intake throttle or by limiting the amount of fuel injected. When the engine load is limited to below the threshold engine load, in certain conditions, the operator requested engine torque may not be delivered. In another example, a fueling schedule may be adjusted for subsequent engine cycles (after the detection of the degraded LNT) by reducing the pulse-width of fuel supplied during each subsequent engine cycle for a number of engine cycles.

Also, an oxidation catalyst or a three-way catalyst for oxidizing residual hydrocarbons and/or carbon monoxide in the exhaust flow may be coupled to the exhaust passage 105. Different exhaust after-treatment catalysts having any of the discussed functionalities may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from first and second LNT 108 and 110 may be released into the atmosphere via main exhaust passage 105 after passing through a muffler 172. A low pressure exhaust gas recirculation (LP-EGR) passage 180 may route exhaust from the exhaust passage 105 (downstream of the turbine 116) to the intake passage 42 (upstream of the compressor 114). EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas temperature sensor 128, a first oxygen sensor 102-1, a second oxygen sensor 102-2, a third oxygen sensor 102-3, MAP sensor 124, exhaust temperature sensor, exhaust pressure sensor, compressor inlet temperature sensor 55, compressor inlet pressure sensor 56, compressor inlet humidity sensor 57, and EGR sensor. Other sensors such as additional pressure, temperature, and composition sensors may be coupled to various locations in engine system 100. The actuators 81 may include, for example, throttle 20, EGR valve 52, wastegate 92, vaporizer 106, and fuel injector 66. The control system 14 may include a controller 12. In one example, the control system 14 may include a single unit. In another example, the control system 14 may include multiple units in communication with the controller 12. The controller 12 may receive input data from the various sensors, process the input data, and trigger various actuators in response to the processed input data based on instruction or code programmed therein corresponding to one or more routines.

For example, based on a first richer than stoichiometric exhaust air-fuel ratio upstream of the first LNT 108 as measured via the first oxygen sensor 102-1, regeneration of the first LNT 108 may be initiated and in response to a richer than stoichiometric exhaust air-fuel ratio downstream of the first LNT as measured via the first oxygen sensor 102-1, degradation of the first LNT 108 may be indicated. A plurality of engine actuators (e.g., fuel injector 66) may be adjusted based on an indication of a degraded LNT. In another example, in response to a second leaner than stoichiometric exhaust air-fuel ratio upstream of the second LNT 110 as measured via the second oxygen sensor 102-2, the vaporizer 106 may be actuated to inject vaporized reductant upstream of the LNT 110.

FIG. 2 provides a layout depicting an exhaust gas after-treatment system 101, in accordance with an implementation of the present subject matter. The exhaust gas after-treatment system 101, further referred to as the system 101, may be the exhaust gas after-treatment system 101 as shown in FIG. 1.

Lean $NO_x$ trap technology typically utilizes alkali metal or alkaline earth materials in combination with platinum in order to store or trap $NO_x$ under lean operating conditions. The mechanism for NO storage involves the oxidation of NO to $NO_2$ over the platinum followed by the subsequent formation of a nitrate complex with the alkaline metal or alkaline earth. Under stoichiometric or richer than stoichiometric conditions, the stored $NO_x$ is first released and is then catalytically reduced on precious metals by the excess of CO, $H_2$, and HCs in the exhaust.

Due to thermal exposure over lifetime, the LNT may deteriorate reducing its ability to store and convert $NO_x$. Therefore, when the LNT storage capacity is sufficiently reduced, a purging event, in particular richer than stoichiometric purging, is indicated. The term purge may be defined as a process of removal to oxides of nitrogen using a richer than stoichiometric regeneration. Typically, the engine air-fuel ratio is changed from leaner to richer than stoichiometric for oxidant release and reduction.

The presently available engine exhaust after-treatment systems, referred to as 'treatment systems' may include more than one LNT for better exhaust after-treatment solution. For example, the treatment system may include an exhaust layout comprising of multiple LNTs. In order to maintain adherence to emission standards and to obtain fuel economy benefits of a lean burning engine, it is desirable to monitor the capacity of the LNT to store oxidants, such as oxygen or NO with a single purging event. Further, for efficient LNT operation, there may be means to decrease the air to fuel ratio in the exhaust gas (increase in exhaust fuel content) to lambda (lambda is the air to fuel ratio relative to stoichiometric value) in a predefined range with sufficient level of reducing agents (HC's and CO) under all engine operating conditions.

For purging the LNT, exhaust gas of a desired air-fuel ratio is to be introduced upstream the LNT and said desired air-fuel ratio may not be obtained by merely injecting some extra fuel upstream of the LNT. The LNT stores NO and also has an oxygen storage function. During a richer than stoichiometric regeneration, the HC and CO supplied to the LNT are being used to convert stored $NO_x$ as well as to convert stored oxygen. The term richer regeneration is the purging of the LNT when an air-fuel mixture richer of stoichiometry or equal to stoichiometry is received therein. The conversion of $NO_x$ is a slower reaction than the conversion of oxygen, since $O_2$ is stored rapidly on the catalyst directly after a richer than stoichiometric regeneration and $NO_x$ storage occurs over a longer time (minutes) before the catalyst gets saturated. When a richer regeneration is triggered after the long $NO_x$ storage period, the lambda downstream signal typically decreases slowly below lambda 1, due to the slow $NO_x$ conversion. Therefore, the exact lambda level, in particular a deep lambda downstream the LNT, is difficult to obtain and this deep lambda downstream of the LNT is desired to monitor the LNT function robustly.

For monitoring respective LNTs, a richer than stoichiometric regeneration of each LNT is desired. In one example, the richer regeneration of the LNT relies on an exhaust gas of a desired air-fuel ratio. In particular, the desired air-fuel ratio may be a stoichiometric ratio or an under stoichiometric ratio.

In operation, the first sensor evaluates an air-fuel ratio of gas exhausted out of the engine when operated in the richer than stoichiometric fueling condition. In one example, the gas exhausted out of the engine may be a first exhaust gas. The richer than stoichiometric fueling condition may be determined based on the engine driving state. Examples of such richer condition may include, data representing the stoichiometric air-fuel ratio or the under stoichiometric air-fuel ratio. In an example, the first sensor evaluates an exhaust gas of a first air-fuel ratio upstream of the first LNT. In another example, the first air-fuel ratio is a desired air-fuel ratio.

Once evaluated, the exhaust gas of the desired air-fuel ratio may be received upstream of the first LNT. The exhaust may be considered so as to include the desired air-fuel ratio varying in between the stoichiometric to the under stoichiometric range. After receiving the exhaust gas in the first LNT, a richer than stoichiometric regeneration of the first LNT is initiated. In one example, a purging event of the first LNT is initiated, in which the leaner than stoichiometric operation of the engine is switched to the richer operation of the engine. In one example, an optimum temperature is to be detected when triggering the richer regeneration of the first LNT. Further, a space velocity of a catalyst may be met for triggering the richer regeneration of the first LNT. When the rich regeneration of the first LNT is initiated, an exhaust gas with an air-fuel ratio is obtained downstream of the first LNT. During the purging event of the first LNT, the lambda characteristic of the exhaust gas may vary from the desired air-fuel ratio. In one example, the exhaust gas received downstream the first LNT may be a second exhaust gas.

To this, the air-fuel ratio of the exhaust gas received downstream of the first LNT is evaluated. Based on the evaluation, it is determined whether the evaluated air-fuel ratio of the exhaust gas is satisfying a predefined threshold defining a working state of the first LNT. In one example, the second sensor is evaluating the air-fuel ratio of the exhaust gas received downstream of the first LNT. The air-fuel ratio, evaluated downstream of the first LNT, may be used to diagnose the first LNT.

Further, when the evaluated air-fuel ratio is higher than the desired air-fuel ratio, a vaporized reductant injection to the exhaust gas is activated by an injector such as a vaporizer disposed between the two LNTs for obtaining an exhaust gas of a desired second air-fuel ratio. The vaporized reductant injection to the exhaust gas obtains a desired lambda for monitoring of the LNT. In one example, when the monitored air-fuel ratio is equal to or less than the desired air-fuel ratio, the monitored air-fuel ratio is considered as the second air-fuel ratio without activating the reductant injection. In one example, the second air fuel ratio of the exhaust gas is well-controlled in terms of stability and threshold value. In one example, the desired air-fuel ratio is at least one of a stoichiometric and an under-stoichiometric ratio. In one example, an additional sensor may be disposed between the second sensor and upstream of the second LNT. The additional sensor may compare the second air-fuel mixture after the reductant injection with a predefined threshold value. In one example, the injector may be an external injector. In another example, the injector may comprise a control mechanism. Further, the control mechanism is to activate a control algorithm based on the evaluation ascertaining the fuel difference to match up the exhaust air-fuel ratio with the predefined threshold or the desired air-fuel ratio. The control algorithm enables the injector for activating the reductant injection in a vaporized form into the exhaust gas.

Once obtaining the exhaust gas of the desired second air-fuel ratio, the exhaust gas with desired second air-fuel ratio is received upstream of the second LNT. In one example, the exhaust gas that exits the first LNT is received directly by the second LNT, provided that the exhaust gas that exits the first LNT has an air-fuel ratio that is equal to or lower than the stoichiometric ratio. In one example, a desired exhaust gas is received upstream of the second LNT.

Once receiving the exhaust gas of the desired second air-fuel ratio, a richer than stoichiometric regeneration of the second LNT is initiated. When the richer regeneration of the second LNT is initiated, an exhaust gas with a third air-fuel ratio is obtained downstream of the second LNT. During the purging event of the second LNT, the lambda characteristic of the other exhaust gas may vary from the desired air-fuel ratio. In one example, the exhaust gas received downstream of the second LNT may be a third exhaust gas.

Further, the third air-fuel ratio of the other exhaust gas received downstream of the second LNT is evaluated. In one example, the third sensor is evaluating the third air-fuel ratio of the other exhaust gas received downstream of the second LNT. The monitoring may determine an ageing of the LNT, if the output air-fuel ratio is not satisfying a predetermined threshold designating whether the LNT is degraded or operational.

Once the air-fuel ratios upstream and downstream of the plurality of LNTs are evaluated, the working states of the LNTs are determined. The working state of the LNT is the ability of the LNT to trap pollutants and to convert them when being reduced during regeneration. The monitoring of the LNT may define the ageing of the LNT and may be indicative of the state of degradation of the LNT.

In one example, the working state of the respective LNT is determined by monitoring an amount of oxygen that enters and exits the LNT over a period of time after the richer than stoichiometric regeneration. Based on the amounts of oxygen being entered and exited through the LNT, an amount of oxygen being trapped in the LNT may be evaluated. The amount of oxygen being trapped may be an indication of the amount of oxygen being consumed for oxidation of pollutants. Further, the amount of oxygen trapped in the LNT may be compared with a predetermined threshold value. The predetermined threshold value may be a range of values, if the amount of oxygen trapped in the LNT falls under said range then the LNT may be assumed to be functional.

In another example, the working state of the respective LNT is determined by evaluating the air-fuel ratio entering the LNT during the richer than stoichiometric regeneration. As a generic scenario, the air-fuel ratio entering the LNT will be the desired air-fuel ratio. The air-fuel ratio exiting the LNT during the richer regeneration is evaluated. The air-fuel ratio exiting the LNT is dependent on the oxidation carried out inside the LNT. Based on the air-fuel ratio entering and exiting the LNT, a relative air-fuel ratio is calculated. Further, the calculated relative air-fuel ratio is compared with a predetermined threshold value. The predetermined threshold value may be a range of values, if the relative air-fuel ratio falls under said range then the LNT may be assumed to be functional.

In such a manner, a desired lambda is obtained for monitoring the engine exhaust after-treatment system. The method monitors the engine exhaust after-treatment system having the plurality of LNTs during one purge event by use of the reductant injection to maximize monitoring frequency and to minimize fuel penalty. The method reduces the complexity of two consecutive purges by omitting a need for satisfying purge triggering conditions twice shortly after each other, therefore the method enables monitoring during one purge event and leads to fuel penalty minimization compared to method carried out by two consecutive purges. In the subject matter described herein, the injector such as the vaporizer needs to add the fuel delta between the downstream first LNT lambda and the target lambda, the downstream first LNT lambda during the richer than stoichiometric regeneration is already $<=1$. This way the amount of fuel to add is limited and additional time may not be required for vaporization of the injected fuel upstream of the second LNT. Therefore, the NOx conversion efficiency of the engine exhaust after-treatment system is monitored efficiently using minimized fuel and simplified technique. The above examples may be implemented in one or more processor-based or other logic devices or systems. Such devices or systems may be integrated within the engine exhaust after-treatment system of a vehicle.

Continuing with FIG. 2, the system 101 includes a plurality of sensors 102-1, 2, 3, collectively referred to as sensor(s) 102. In one example, the sensor(s) 102 may be universal exhaust gas oxygen (UEGO) sensor. In one example, the UEGO sensors are also known as proportional oxygen sensors. Each of the plurality of sensor(s) 102 may be provided for monitoring the plurality of LNTs in an engine exhaust after-treatment system. In one example, the plurality of sensor(s) 102 may evaluate air-fuel ratios at different stages in the system 101. It should be noted that the manner in which the sensor(s) 102 is provided depends on the air-fuel ratio being evaluated. It would be understood that values of the air-fuel ratios, as measured by the sensor(s) 102 may be dependent on how the engine is being operated and in what conditions the engine is being operated.

The plurality of Lean $NO_x$ traps (LNTs) includes, but is not limited to, a first LNT 108 and a second LNT 110. The first LNT 108 and the second LNT 110 are coupled to an engine 104. In one example, the second LNT 110 is disposed downstream of the first LNT 108 relative to the direction of exhaust flow from the engine. The second LNT 110 has a downstream exit and is coupled with the first LNT 108. In another example, a diesel particulate filter is disposed downstream of the first LNT 108.

As would be understood referring to FIG. 2, the emissions stream is produced by the engine 104 and flows out of the engine 104 through an emission inlet. Further, an injector 106 is disposed between the first LNT 108 and the second LNT 110. In one example, multiple injectors may be present. The injector 106 may be a vaporizer which may introduce a vaporized reductant such as fuel (containing HC) via an introduction port when indicated to fulfill an air-fuel ratio requests.

Further, the system 101 may include a treatment system monitor 112 operably coupled to the sensor(s) 102, controllers and the injector 106. In one example, the system monitor 112 may be control system 14 as shown in FIG. 1. The treatment system monitor 112 operably interacts with the signals of the sensor(s) 102 for appropriately monitoring the LNTs 108, 110.

In an example, more than one LNTs may be mounted anywhere in the engine exhaust after-treatment system. A typical layout is where the first LNT is mounted in the engine exhaust after-treatment system in the close coupled position to the engine and the second LNT is mounted in the engine exhaust after-treatment system in an under floor position.

As would be understood, a combination of values of various air-fuel ratios may be considered as corresponding to the engine action generally considered as appropriate. For example, appropriate engine actions may include operation rich of stoichiometry and stoichiometric operation. In one example, values of air-fuel ratios corresponding to appropriate actions may be predefined. Such engine actions may be considered as forming a desired air-fuel ratio corresponding to generally acceptable actions considered fit for monitoring the engine exhaust after-treatment system. In one example, desired air-fuel ratio is based on historically collected data based on the engine actions executed by other vehicles of same category.

Continuing with the implementation as illustrated in FIG. 2, the sensor(s) 102 may be further coupled to the engine 104 and the LNTs 108, 110. The sensor(s) 102 generate a signal whose magnitude is proportional to the oxygen level (air-fuel ratio) in the exhaust gas. The signal is provided to a controller (not shown), which converts it into a relative air-fuel ratio. The signal is used during feedback air-fuel ratio control to maintain average air-fuel ratio at a desired air-fuel ratio as described. In one example, the sensor(s) 102 may provide exhaust gas oxygen signal indicating whether exhaust air-fuel ratio is lean or rich of stoichiometry. In another example, the sensor(s) 102 may comprise one of a carbon monoxide sensor, a hydrocarbon sensor, and a $NO_x$ sensor that generates a signal whose magnitude is related to the level of carbon monoxide, hydrocarbon, $NO_x$ respectively in the exhaust gases. In one example, an additional oxygen sensor 103 may be disposed downstream of the vaporizer 106 and upstream of the second LNT 110 (between the second sensor 102-2 and the second LNT 110). The additional sensor 103 may compare the exhaust gas with a predefined threshold value. As such, the first sensor 102-1 positioned upstream of the first LNT 108 and the sensor 103 positioned upstream of the second LNT may be optional.

The treatment system monitor 112 may be implemented as a logic-based system. In one implementation, the treatment system monitor 112 may further include a processing logic circuit for processing data obtained through the sensor(s) 102. In one example, the treatment system monitor 112 may further include monitoring function, which may be implemented as hardware (such an electronic circuitry with embedded instructions), or as software (executable by a processing resource of a computing system). As such, the treatment system monitor the system monitor 112 may be part of or in communication with control system 14 of FIG. 1.

The system 101 may either be implemented as a computing based system integrated within any engine exhaust after treatment system of the vehicle. The data gathered from the sensor(s) 102 may be persistently maintained within a repository (not shown in FIG. 2). Based on requests, a communication may be established between the repository and the system 101. The treatment system monitor 112 on obtaining the data may process the data for providing one or more monitoring functions.

In this way, the system of FIGS. 1 and 2 enable a system for an engine comprising: an intake system; an exhaust system including a first lean NOx trap (LNT) coupled to an exhaust passage, a second LNT coupled to the exhaust passage downstream of the first LNT, a first oxygen sensor coupled to the exhaust passage upstream of the first LNT, a second oxygen sensor coupled to the exhaust passage upstream of the second LNT, a third oxygen sensor coupled to the exhaust passage downstream of the second LNT, and a vaporizer coupled to the exhaust passage upstream of the second LNT and downstream of the second oxygen sensor; a turbocharger including a turbine coupled to the exhaust passage, a turbine driven compressor coupled to the intake system, and a waste-gate bypassing the turbine; and a controller with computer readable instructions stored on non-transitory memory for: in response to a sensed first exhaust air-fuel ratio upstream of the first LNT being lower than a stoichiometric air-fuel ratio, regenerating the first LNT, in response to a sensed second exhaust air-fuel ratio downstream of the first LNT being higher than the stoichiometric air-fuel ratio, initiating injection of vaporized fuel to exhaust gas via the vaporizer to decrease the sensed second air-fuel ratio to below the stoichiometric air-fuel ratio, then regenerating the second LNT, and initiating diagnostics of each of the first LNT and the second LNT.

The operation and working of the system 101 is provided in conjunction with a detailed illustration 300 of the treatment system monitor 112 as provided in FIG. 3. In one implementation of the present subject matter, as depicted in FIG. 3, the treatment system monitor 112 is implemented as a computing device for monitoring a plurality of Lean $NO_x$ Traps (LNTs) in an engine exhaust after-treatment system. In one example, the treatment system monitor the system monitor 112 may be part of or in communication with the control system 14 of FIG. 1. As such, the engine exhaust after-treatment system may be present inside a vehicle. Continuing with the present implementation, the treatment system monitor 112 may further include interface(s) 301, a processing unit(s) 302, and memory 304. The interface(s) 300 may include a variety of interfaces, for example, interfaces for data input and output devices, referred to as I/O devices, storage devices, network devices, and the like, for communicatively associating the system 101 with the interface 300 of a vehicle (not shown in FIG. 3). The interface(s) 300 may also be used for facilitating communication between the treatment system monitor 112 and various other computing devices connected in a network environment.

The processing unit(s) 302 may also be implemented as signal processor(s), state machine(s), logic circuitries, and/or any other device or component that manipulates signals based on operational instructions. In one example, the treatment system monitor 112 includes, but is not limited to, the processing unit(s) 302. In another example, the processing unit(s) 302 may be implemented as a controller to control or execute various functions associated with the treatment system monitor 112. In one example, the controllers may include a first controller, a second controller, and a third controller. In an example, the controllers are operably coupled to the sensor(s) 102.

The memory 304 may store one or more computer-readable instructions, which may be fetched and executed for providing one or more air-fuel ratios to the controllers of the monitor 112. The memory 304 may include any non-transitory computer-readable medium including, for example, volatile memory, such as RAM, or non-volatile memory such as EPROM, flash memory, and the like.

The treatment system monitor 112 may further include module(s) 306 and data 308. The module(s) 306 may be implemented as a combination of hardware and programming (e.g., programmable instructions) to implement one or more functionalities of the module(s) 306. In one example, the module(s) 306 include a control module 310, a monitoring module 312, a determining module 314, and other module(s) 316. The data 308 on the other hand include air-fuel ratio data 318, predefined threshold data 320, and other data 322.

In examples described herein, such combinations of hardware and programming may be implemented in a number of different ways. For example, the programming for the module(s) 306 may be processor executable instructions stored on a non-transitory machine-readable storage medium and the hardware for the module(s) 306 may include a processing resource (e.g., one or more processing units), to execute such instructions. In the present examples, the machine-readable storage medium may store instructions that, when executed by the processing resource, implement module(s) 306 or their associated functionalities. In such examples, the treatment system monitor 112 may include the machine-readable storage medium storing the instructions and the processing resource to execute the instructions, or the machine-readable storage medium may be separate but accessible to treatment system monitor 112 and the processing resource. In other examples, module(s) 306 may be implemented by electronic circuitry.

In operation, the treatment system monitor 112 may obtain values corresponding to the one or more air-fuel ratio data 318. In one example, the air-fuel ratio data 318 may be obtained from the sensor(s) 102. As explained previously, air-fuel ratio data 318 may include, but are not limited to, stoichiometric ratio, rich of stoichiometry ratio, desired air-fuel ratio, and air-fuel ratios at the outlet of the LNTs. Furthermore, values stored in the air-fuel ratio data 318 may be dependent on the manner in which the engine is operated. For example, values of the air-fuel ratio data 318 for new engines may differ from those operating in an older engine.

An engine control unit (not shown) operates the engine 104 in fuel richer than stoichiometric condition. In one example, engine control unit may be coupled to the processing unit(s) 302. Operation in fuel richer condition is generally an operation rich of stoichiometry or a stoichiometric operation. The engine is operated to produce an exhaust gas of a certain air-fuel ratio. On obtaining the certain air-fuel ratio, which may be stored in the memory 304 as the air-fuel ratio data 318, the first sensor 102-1 may monitor the certain air-fuel ratio of the exhaust gas received upstream of the first LNT 108 from the engine 104.

Further, the processing unit(s) 302 implemented as the controller is coupled to the first sensor 102-1 to ascertain whether the certain air-fuel ratio is a desired air-fuel ratio. In one example, the first controller is coupled to the first sensor 102-1. The desired air-fuel ratio can be selected from the predefined threshold data 320. Once ascertained that the certain air-fuel ratio is the desired air-fuel ratio, the received air-fuel mixture is designated as a first air-fuel mixture. In continuation, the first LNT 108 may receive the exhaust gas of the desired air-fuel ratio via a port (not shown).

Once the exhaust gas of the first air-fuel ratio is received, the control module 310 is activated by the first controller to initiate a richer than stoichiometric regeneration of the first LNT 108. The richer regeneration of the first LNT 108 may convert the $NO_x$ trapped inside the first LNT and ultimately leads to release of an exhaust gas of an air-fuel ratio downstream of the first LNT 108. The second sensor 102-2 coupled to the second controller and disposed downstream of the first LNT 108 receives the exhaust air-fuel mixture of the air-fuel ratio downstream of the first LNT 108. The second sensor 102-2 may evaluate the air-fuel ratio of the exhaust gas received downstream of the first LNT 108. The second sensor 102-2 transmits the signal to the second controller, and the monitoring module 312 coupled to the first controller and the second controller, may monitor the air-fuel ratio of the exhaust gas received downstream of the first LNT 108 and ascertain whether the monitored air-fuel ratio of the exhaust gas received downstream of the first LNT 108 is higher than the desired air-fuel ratio. If the air-fuel ratio of the exhaust air-fuel mixture is not higher than the desired air-fuel ratio, then the same exhaust gas may be communicated to the next stage.

If this is not the case and the air-fuel ratio of the exhaust gas is higher than the desired air-fuel ratio, then the controller activates the injector 106 which may be a vaporizer. The injector 106 is coupled to the controller and the monitoring module 312. The injector 106 is disposed downstream of the first LNT 108 and the second sensor 102-2 and is also disposed upstream of the second LNT 110. The injector 106 may be activated to trigger a vaporized reductant injection to the exhaust gas received downstream of the first LNT 108 being monitored by the second sensor 102-2. The reductant injection may be triggered to obtain the exhaust gas of the desired air-fuel ratio by injection of the reductant in a vaporized state to a predefined limit, thereby obtaining the exhaust gas of the desired air-fuel ratio matching the predefined threshold data 320 within a short time following the injection. Once the exhaust of the desired air-fuel ratio is obtained, in continuation, the second LNT 110 may receive the exhaust gas of the desired air-fuel ratio via a port (not shown).

Once the exhaust gas of the second air-fuel ratio is received by the second LNT 110, the control module 310 is further activated by the controller to initiate a richer than stoichiometric regeneration of the second LNT 110. The richer regeneration of the second LNT 110 may lead to release of $NO_x$ trapped inside the second LNT 110 and ultimately leads to release of another exhaust gas of an air-fuel ratio downstream of the second LNT 110. The third sensor 102-3, coupled to the third controller and disposed downstream of the second LNT 110, receives the other exhaust gas of the air-fuel ratio downstream of the second LNT 110. The third sensor 102-3 may evaluate the air-fuel ratio of the other exhaust gas received downstream of the second LNT 110. The sensor 102-3 transmits the signal to the controller for further determining of a working state of the engine exhaust after-treatment system 101.

Once the air-fuel ratios upstream and downstream of the first and second LNTs 108, 110 are evaluated, the working states of the first and second LNTs 108, 110 are determined. The working state of the LNT is the ability of the LNT to trap pollutants and to release them when being oxidized during regeneration. The monitoring of the LNT may define the ageing of the LNT and may be indicative of the state when the LNT is degraded. To this, the determining module 314 coupled to the controllers and the third sensor 102-3 is activated. The determining module 314 gathers the air-fuel ratio data 318 upstream and downstream of the first LNT 108 and the second LNT 110. The determining module 314 guides the gathered data to the control module 310. The control module 310 compares the gathered data upstream and downstream of the first LNT 108 and the second LNT 110 with the predefined threshold data 220. Based on the comparison, it is determined whether further purging is indicated or the LNT needs replacement.

By the impact of the treatment system monitor 112, a desired air-fuel ratio is obtained for monitoring the engine exhaust after-treatment system 101 at every stage of exhaust cycle. The treatment system monitor 112 monitors the engine exhaust after-treatment system 101 having the plurality of LNTs during one purge event by use of the injector 106 to maximize monitoring frequency and to minimize fuel penalty by injecting reductant in a quantity which is indicated to convert the exhaust gas of any air-fuel ratio to the desired air-fuel ratio. The complexity of two consecutive purges is omitted with the present treatment system monitor 112 described herein.

Figure 4:
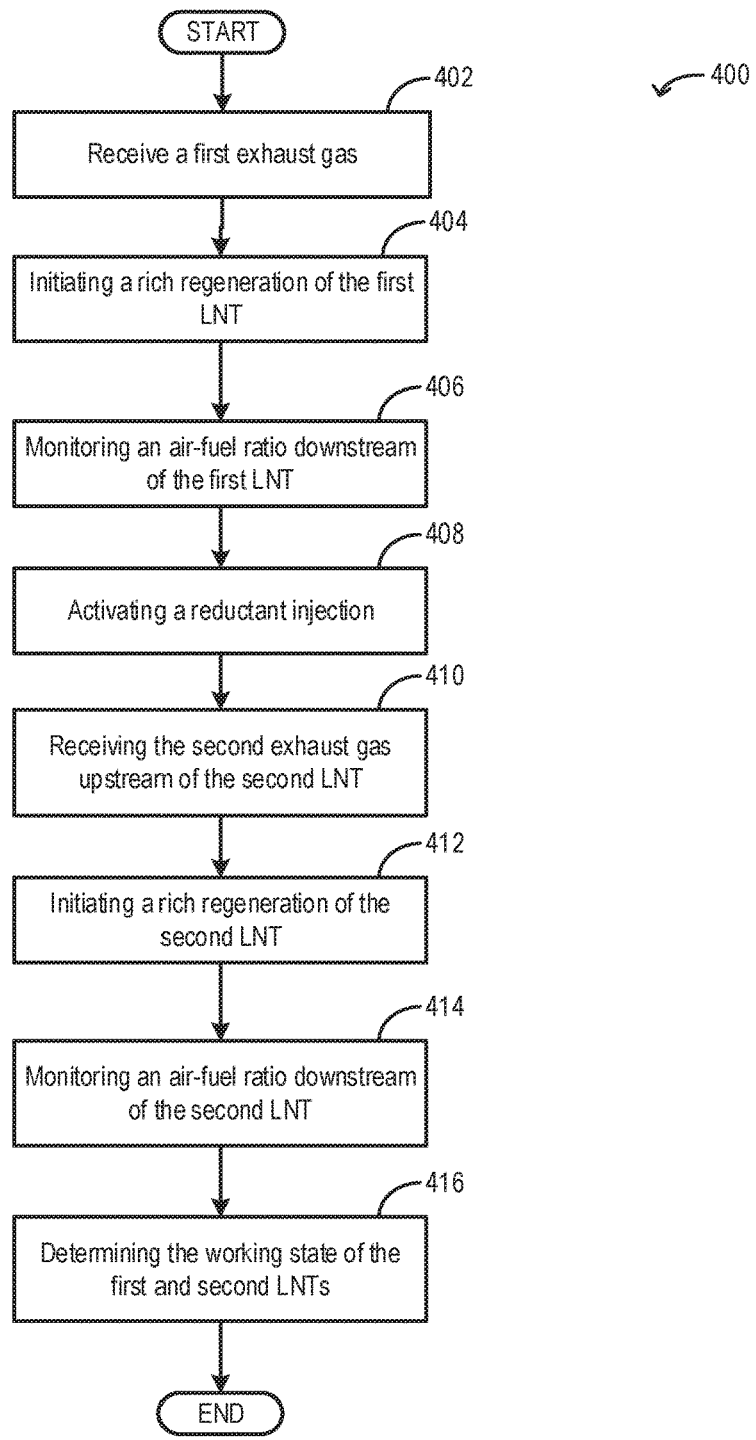
FIG. 4 illustrates a first flow chart of a method for monitoring an engine exhaust after-treatment system, as per an implementation of the present subject matter.

FIG. 4 illustrates an example method 400 for monitoring more than one lean $NO_x$ traps (such as LNTs 108 and 110) in an engine exhaust after-treatment system according to an implementation of the present subject matter. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

It may also be understood that the method 400 may be performed by programmed computing devices, such as the treatment system monitor as depicted in FIG. 3. Furthermore, the method 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 400 is described below with reference to the treatment system monitor as described above; other suitable systems for the execution of this method may also be utilized. Additionally, implementation of these methods is not limited to such examples.

Returning to FIG. 4, at 402, the first LNT (such as first LNT 108 in FIG. 1) may receive the exhaust gas of the desired air-fuel ratio. Before the first LNT 108 receives the exhaust gas of the desired air-fuel ratio, the first sensor (such as first sensor 102-1 in FIG. 1) may evaluate the exhaust gas of the certain air-fuel ratio received upstream of the first LNT. The first controller coupled to the first sensor ascertains whether the certain air-fuel ratio is a desired air-fuel ratio. In one example, the received exhaust gas may be designated as a first exhaust gas. In one example, the air-fuel ratio data may be obtained through one or more sensor(s) deployed within the vehicle. In one example, the air-fuel ratio data may include data representative of the manner in which the engine is being operated. In another example, it may be considered as a representation of one or more actions executed by the engine control unit while operating the engine under consideration.

At 404, in response to exhaust having a richer than stoichiometric air-fuel ratio entering the first LNT, regeneration of the first LNT may be initiated. The richer regeneration of the first LNT may lead to conversion of $NO_x$ trapped inside the first LNT and ultimately leads to release of an exhaust gas of an air-fuel ratio downstream of the first LNT. Further, the second sensor (such as second sensor 102-2 in FIG. 1) coupled to the second controller and disposed downstream of the first LNT may receive the exhaust gas of the air-fuel ratio downstream of the first LNT.

At 406, the second sensor may evaluate the air-fuel ratio of the exhaust gas received downstream of the first LNT. The second sensor transmits the signal to one of the controllers, and the controller may activate the monitoring module to monitor the air-fuel ratio of the exhaust gas received downstream of the first LNT and ascertain whether the monitored air-fuel ratio of the exhaust gas received downstream of the first LNT is higher than the desired air-fuel ratio.

At 408, if the air-fuel ratio of the exhaust gas is higher than the desired air-fuel ratio, then the controller activates the injector (such as injector 106 in FIG. 1). The injector may be activated to trigger a reductant injection in its vaporized state to the exhaust gas received downstream of the first LNT as being monitored by the second sensor. The reductant injection may be triggered to obtain the exhaust gas of the desired air-fuel ratio by injection of the reductant to a predefined limit, thereby obtaining the exhaust gas of the desired air-fuel ratio matching the predefined threshold data. In this manner, the injector is controlled to add the fuel delta between the downstream first LNT lambda and the target lambda, this way the amount of fuel to be added is limited. Therefore, the efficiency and degradation of the efficiency of the engine exhaust after-treatment system is monitored efficiently using minimized fuel and simplified technique.

At 410, the second LNT (such as second LNT 110 in FIG. 1) may receive the exhaust gas of the desired (richer than stoichiometric) air-fuel ratio.

At 412, in response to exhaust having a richer than stoichiometric air-fuel ratio entering the second LNT, regeneration of the second LNT may be initiated. The rich regeneration of the second LNT may lead to release of $NO_x$ trapped inside the second LNT and ultimately lead to release of exhaust gas of an air-fuel ratio downstream of the second LNT. The third sensor (such as third sensor 102-3 in FIG. 1), coupled to the third controller and disposed downstream of the second LNT may receive the exhaust gas of the air-fuel ratio downstream of the second LNT.

At 414, the air-fuel ratio of the exhaust gas received downstream of the second LNT may be evaluated by the third sensor. The sensor transmits the signal to the controller for further determining of a working state of the engine exhaust after-treatment system.

At 416, based on the evaluation of the air-fuel ratios upstream and downstream of the first and second LNTs, the working states of the first and second LNTs are determined by the determining module. The working state of the LNT is the ability of the LNT to trap pollutants and to release them when being oxidized during regeneration. The monitoring of the LNT may define the ageing state of the LNT and may be indicative of the state when the LNT is degraded. To this, the determining module coupled to the controller and the third sensor is activated. The determining module gathers the air-fuel ratio data upstream and downstream of the first LNT and the second LNT. The determining module 214 sends the gathered data to the control module. The control module compares the gathered data upstream and downstream of the first LNT 108 and the second LNT 110 with the predefined threshold data 220. Based on the comparison, it is determined whether further purging is indicated or the LNT needs a replacement (reached an end-of-life state).

Figure 5:
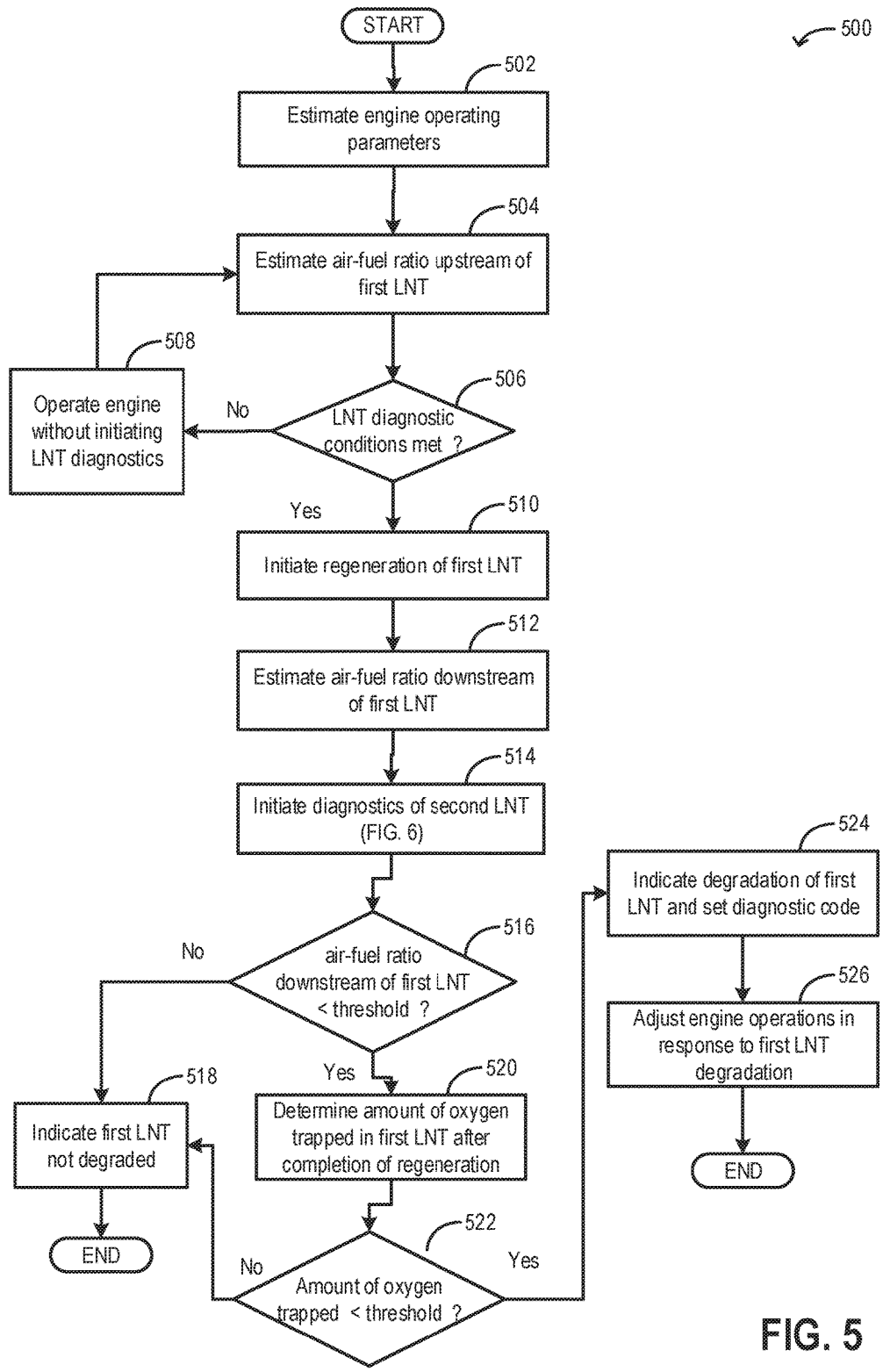
FIG. 5 shows a second flow chart illustrating an example method that may be implemented for diagnostics of a first Lean NOx trap (LNT) of the exhaust after-treatment system.

FIG. 5 illustrates an example method 500 that may be implemented for diagnostics of a first lean NOx trap (such as LNT 108) of the exhaust after-treatment system. At 502, the routine includes estimating and/or measuring engine operating conditions. Conditions assessed may include, for example, engine temperature, engine load, driver torque demand, engine speed, throttle position, exhaust pressure, ambient conditions including ambient temperature, pressure, and humidity, MAP, MAF, boost, etc. At 504, a first exhaust air-fuel ratio may be measured upstream of the first LNT via an exhaust oxygen sensor (such as first oxygen sensor 102-1 in FIG. 1) coupled to the exhaust passage upstream of the first LNT. The first air-fuel ratio may be an indication of fuel content in exhaust flowing through the first LNT.

At 506, the routine includes determining if the conditions for carrying out diagnostics of the first LNT has been met. Diagnostics of the first LNT may be carried out during regeneration and after completion of regeneration of the first LNT. In one example, the conditions for carrying out regeneration of the first LNT include a desired exhaust air-fuel ratio upstream of the first LNT, and a desired exhaust temperature upstream of the first LNT. In one example, a richer than stoichiometric exhaust air-fuel ratio upstream of the first LNT is desired for regeneration of the first LNT as the hydrocarbons from the rich exhaust are used to treat the NOx trapped in the first LNT and convert the NOx to nitrogen and water. As such, engine operation may be opportunistically adjusted to operate the engine with a richer than stoichiometric exhaust air-fuel ratio such that diagnostics of the LNTs may be carried out. Also, for regeneration of the first LNT, the desired exhaust temperature of the first LNT may be above a threshold temperature, the threshold temperature being the light-off temperature of the first LNT. Below the light-off temperature of the first LNT, the regeneration and diagnostics of the first LNT may not be effectively carried out.

If it is determined that the exhaust air-fuel ratio upstream of the first LNT is leaner than stoichiometry and/or the exhaust temperature upstream of the first LNT is lower than the threshold temperature, it may be inferred that LNT regeneration may not be carried out. At 508, the engine may be operated without initiating diagnostics of each of the first LNT and the second LNT.

If it is determined that conditions for regeneration of the first LNT such as a richer than stoichiometric exhaust air-fuel ratio upstream of the first LNT and a higher than threshold exhaust temperature upstream of the first LNT are met, it may be confirmed that conditions for diagnostics of the first LNT have been met. At 510, the richer than stoichiometric exhaust air-fuel ratio upstream of the first LNT may result in initiation of regeneration of the first LNT. During regeneration of the first LNT, the NOx stored in the first LNT may be purged and converted to nitrogen and water which may be released to the atmosphere. As the hydrocarbon from fuel in the exhaust is utilized in purging the NOx trapped in the first LNT, during regeneration of the first LNT, the fuel content of exhaust exiting the first LNT may be lower than the fuel content of exhaust entering the LNT. Hence, the air-fuel ratio of exhaust exiting the first LNT may be less rich relative to the air-fuel ratio of exhaust entering the first LNT. Regeneration of the first LNT may be continued until the entire amount of NOx trapped in the first LNT has been treated.

During regeneration of the first LNT trap, at 512, the air-fuel ratio of exhaust downstream of the first LNT (exiting the first LNT) may be measured via a second exhaust oxygen sensor (such as oxygen sensor 102-2 in FIG. 1) coupled to the exhaust passage downstream of the first LNT. The exhaust exiting the first LNT may enter the second LNT (such as second LNT 110) coupled to the exhaust passage downstream of each of the first LNT and the second exhaust oxygen sensor.

At 514, diagnostics of the second LNT may be initiated in response to the air-fuel of exhaust entering the second LNT being richer than stoichiometry. If the exhaust air-fuel ratio downstream of the first LNT is leaner than stoichiometry, the exhaust air-fuel ratio may be opportunistically adjusted before the exhaust enters the second LNT. Details of the adjustment of exhaust air-fuel ratio upstream of the second LNT and diagnostics of the second LNT is discussed in detail with relation to FIG. 6.

At 516, the routine includes determining if the measured air-fuel ratio downstream of the first LNT is lower than a threshold. The threshold may be a stoichiometric air-fuel ratio and the controller may determine if the exhaust air-fuel ratio downstream of the first LNT is richer than stoichiometry. If it is determined that the air-fuel ratio of exhaust exiting the first LNT is higher than the threshold (such as leaner than stoichiometry), it may be inferred that the fuel in the exhaust may have been optimally utilized in regeneration of the first LNT. Therefore, at 518, it may be indicated that the first LNT is not degraded and is optimally functional and further diagnostics of the first LNT may not be desired for the moment.

However, if it is determined that even during regeneration of the first LNT, the exhaust air-fuel ratio downstream of the first LNT is lower than the threshold (such as richer than stoichiometry), it may be inferred that the fuel in the exhaust may not have been optimally utilized for regenerating the first LNT, thereby indicating a possible degradation of the first LNT. In order to further continue the diagnostics of the first LNT, at 520, the amount of oxygen trapped in the first LNT, within a threshold duration after completion of regeneration of the first LNT, may be determined. In one example, the amount of oxygen trapped in the first LNT may be estimated over a threshold number of engine cycles immediately after the engine cycle at which the regeneration of the first LNT has been completed. When the first LNT is completely functional (there is not degradation), once regeneration of the first LNT is completed, during leaner than stoichiometric engine operation, oxidants such as the oxygen and NOx present in the exhaust may be adsorbed by the LNT. During the threshold duration, the first amount of oxygen entering the first LNT may be measured via the first exhaust oxygen sensor coupled to the exhaust passage upstream of the first LNT and the second amount of oxygen exiting the first LNT may be measured via the second exhaust oxygen sensor coupled to the exhaust passage downstream of the first LNT. The amount of oxygen trapped in the first LNT may be estimated based on the first amount of oxygen entering the first LNT and the second amount of oxygen exiting the first LNT.

At 522, the routine includes determining if the amount of oxygen trapped in the first LNT during the threshold duration is lower than a threshold amount of oxygen. The threshold amount of oxygen may correspond to the amount of oxygen expected to be trapped in the functional first LNT during the threshold time. In one example, the threshold amount of oxygen may be adjusted based on the current engine operating conditions. As such, the threshold amount of oxygen may increase as the engine is operated with leaner than stoichiometric air-fuel ratio. As the operating exhaust air-fuel ratio gets leaner, a higher amount of oxygen enters the first LNT and may be trapped by the first LNT.

If it is determined that the amount of oxygen trapped in the first LNT is higher than the threshold amount of oxygen, it may be inferred that after regeneration of the first LNT, the first LNT may be operating optimally. Therefore, at 518, it may be indicated that there is no degradation of the first LNT. However, if it is determined that after regeneration of the first LNT, the amount of oxygen trapped at the first LNT is lower than the threshold, at 524, detection of degradation of the first LNT may be indicated. A degradation (such as corresponding to an end-of-life state) of the first LNT may be indicated by setting a flag or a diagnostic code, or activating a malfunction indicator lamp in order to notify the vehicle operator that the LNT is degraded and needs to be replaced.

In response to the indication of degraded LNT, at 526, the controller may adjust the operation of one or more engine actuators to adjust engine operation. As one example, in response to the indication of the degraded LNT, the controller may adjust the fueling schedule (such as limiting the maximum amount of fuel injected), limit an engine load (e.g., by reducing an opening of an intake throttle), limit an engine torque output, and/or reduce boost pressure (e.g., by opening a wastegate coupled to an exhaust turbine or a bypass valve coupled to an intake compressor, opening the vanes of a VGT) for a second number of engine cycles following the first number of engine cycles.

Figure 6:
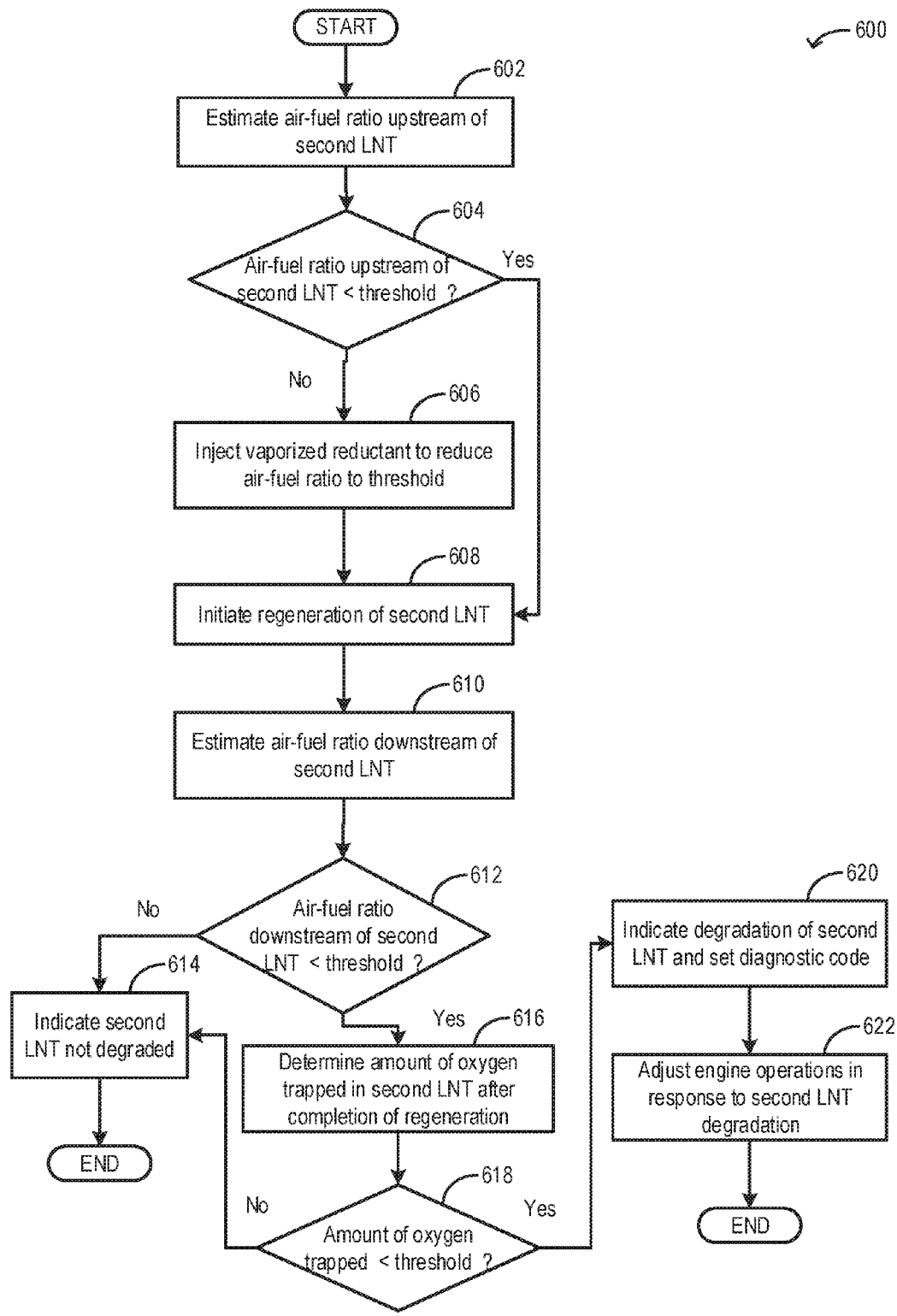
FIG. 6 shows a third flow chart illustrating an example method that may be implemented for diagnostics of the second LNT of the exhaust after-treatment system.
Figure 7:
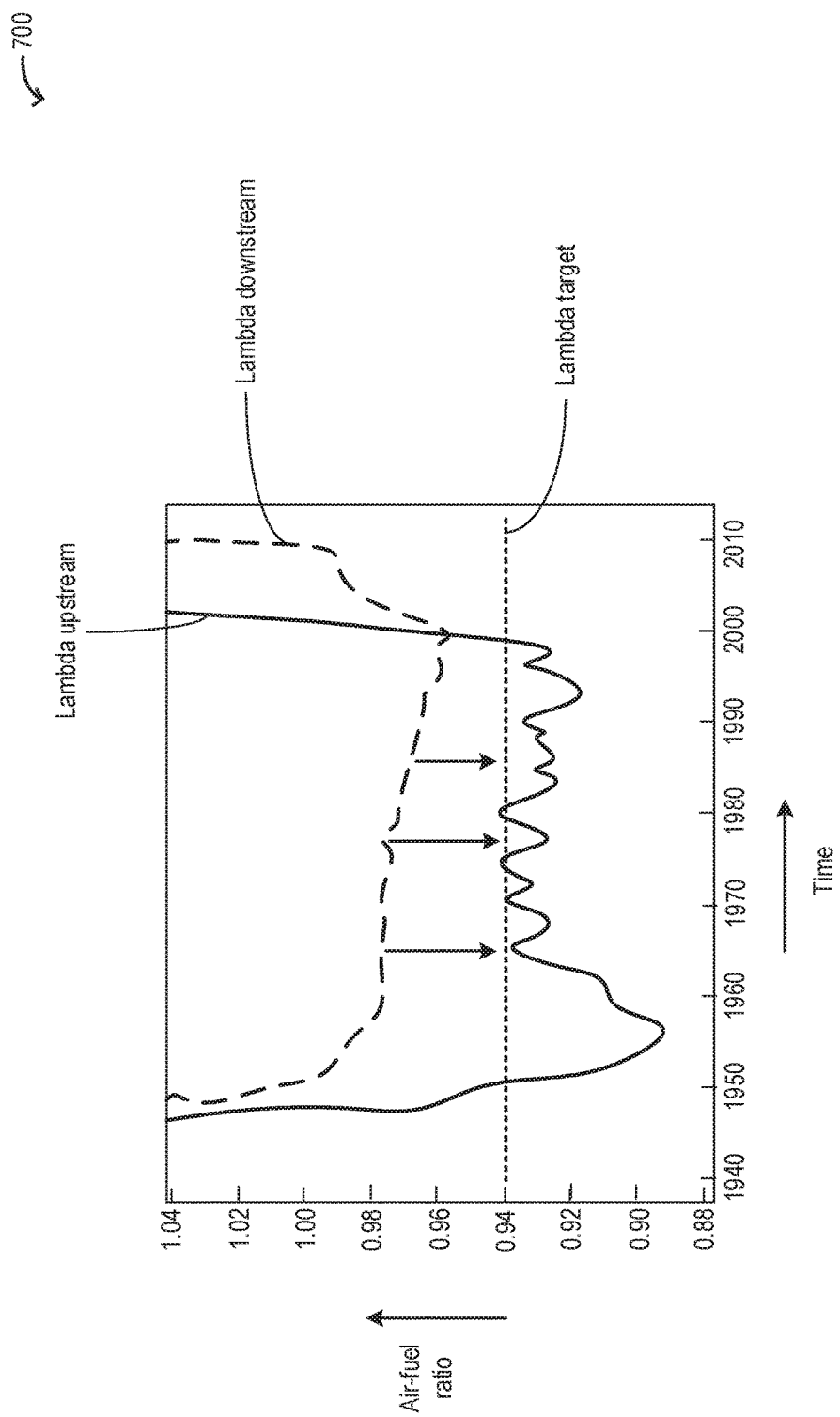
FIG. 7 illustrates an example graphical representation of lambda signals upstream and downstream of the first LNT during a regeneration when reductant injection is activated.

FIG. 6 illustrates an example method 600 that may be implemented for diagnostics of a second Lean NOx trap (such as LNT 110) of the exhaust after-treatment system. The method 600 may be a part of the example method 500 as described in FIG. 5, and may be carried out during regeneration (and diagnostics) of the first LNT, at step 514 of method 500. The diagnostics of the first and the second LNTs may be carried out simultaneously as the two LNTs are concurrently regenerated. By opportunistically carrying out the regeneration of each of the LNTs, diagnostics of the entire exhaust gas after-treatment system may be completed.

At 602, a first exhaust air-fuel ratio may be measured upstream of the second LNT via an exhaust oxygen sensor (such as second oxygen sensor 102-2 in FIG. 1) coupled to the exhaust passage upstream of the second LNT. The first air-fuel ratio may be an indication of fuel content in exhaust exiting the first LNT during regeneration of the first LNT.

At 604, the routine includes determining if the exhaust air-fuel ratio upstream of the second LNT is lower than a threshold air-fuel ratio. In one example, the threshold air-fuel ratio may correspond to a stoichiometric air-fuel ratio and the routine may include determining if the exhaust air-fuel ratio upstream of the second LNT is richer than stoichiometric. In another example, the threshold air-fuel ratio may correspond to a desired richer than stoichiometric air-fuel ratio and the routine may include determining if the exhaust air-fuel ratio upstream of the second LNT is even richer than the desired richer than stoichiometric air-fuel ratio. A richer than stoichiometric air-fuel ratio may be desired at the second LNT for initiation of regeneration of the second LNT. The fuel available in the richer than stoichiometric air-fuel mixture may be effectively utilized for treating the NOx trapped in the second LNT and converting the NOx to nitrogen and water.

If it is determined that the air-fuel ratio upstream of the second LNT is higher than the threshold (such as leaner than stoichiometry), regeneration of the second LNT may not be initiated until the exhaust air-fuel ratio entering the second LNT is adjusted to be richer than stoichiometric. Therefore, at 606, an amount of vaporized reductant may be injected to the exhaust gas upstream of the second LNT via an injector such as a vaporizer (such as injected 106 in FIG. 1), until the exhaust air-fuel ratio entering the second LNT changes to a richer than stoichiometric air-fuel ratio. In one example, the vaporizer may be positioned upstream of the second LNT and the injected reductant may be fuel. As the fuel is injected in the vaporized state, additional time may not be required to allow for vaporization of fuel and a richer than stoichiometric air-fuel ratio may be available at the second LNT within a shorter duration. If instead of injecting vaporized fuel, liquid fuel would have been injected, a portion of the fuel may not have vaporized and hence a larger portion of fuel may have been injected to attain the desired richer than stoichiometric air-fuel ratio at the second LNT. Therefore, injection of vaporized fuel leads to increased fuel efficiency. The amount of vaporized fuel injected may be adjusted based on the measured air-fuel ratio upstream of the second LNT. In one example, the amount of vaporized fuel injected may be increased as the measured air-fuel ratio upstream of the second LNT increases above the threshold (is leaner than stoichiometry). In another example, the amount of vaporized fuel injected may be decreased as the measured air-fuel ratio upstream of the second LNT decreases below the threshold. The controller may determine the amount of vaporized fuel to the injected through a determination that directly takes into account exhaust air-fuel ratio upstream of the second LNT, such as increasing the amount of vaporized fuel with an increase in the exhaust air-fuel ratio. Further, the controller may determine the amount of vaporized fuel to be injected through a determination that directly takes into account exhaust gas mass flow upstream of the second LNT, such as increasing the amount of vaporized fuel with a decrease in the gas mass flow. The controller may alternatively determine the amount of vaporized fuel based on a calculation using a look-up table with the inputs being each of the exhaust air-fuel ratio and the exhaust gas mass flow upstream of the second LNT and the output being the amount of vaporized fuel to be injected. The controller may then send a signal to the vaporizer to increase the pulse width of the vaporized fuel injection based on the determined amount.

At 608, the richer than stoichiometric exhaust air-fuel ratio upstream of the second LNT may result in regeneration of the second LNT. By injecting vaporized fuel and adjusting the air-fuel ratio of exhaust entering the second LNT to richer than stoichiometry, regeneration of the second LNT may be initiated immediately after initiation of regeneration of the first LNT, thereby allowing the diagnostics of each of the two LNTs to be carried out concurrently. If it is determined (at step 604) that the exhaust air-fuel ratio upstream of the second LNT is richer than stoichiometry, the routine may directly proceed to step 608 and regeneration of the second LNT may be initiated without injection of reductant. During regeneration of the second LNT, the NOx stored in the second LNT may be purged and converted to nitrogen and water which may be released to the atmosphere. As the hydrocarbon from fuel in the exhaust is utilized in purging the NOx trapped in the second LNT, during regeneration of the second NOx trap, the fuel content of exhaust exiting the second LNT may be lower than the fuel content of exhaust entering the second LNT.

During regeneration of the second LNT, at 610, the air-fuel ratio of exhaust downstream of the second LNT (exiting the second LNT) may be measured via a third exhaust oxygen sensor (such as oxygen sensor 102-3 in FIG. 1) coupled to the exhaust passage downstream of the second LNT.

At 612, the routine includes determining if the measured air-fuel ratio downstream of the second LNT is lower than a threshold. The threshold may be a stoichiometric air-fuel ratio and the controller may determine if the exhaust air-fuel ratio downstream of the second LNT is richer than stoichiometry. If it is determined that the air-fuel ratio of exhaust exiting the second LNT is higher than the threshold (such as leaner than stoichiometry), it may be inferred that the fuel in the exhaust may have been utilized in regeneration of the second LNT. Therefore, at 614, it may be indicated that the second LNT is not degraded and is functional and further diagnostics of the second LNT may not be desired at this point in time. Method 600 proceeds to exit after indicating that the second LNT is not degraded.

However, if it is determined that even during regeneration of the second LNT, the exhaust air-fuel ratio downstream of the second LNT is lower than the threshold (such as richer than stoichiometry), it may be inferred that the fuel in the exhaust may not have been utilized for regenerating the second LNT, thereby indicating a possible degradation of the second LNT.

Also, for diagnostics of the LNTs, a relative air-fuel ratio estimated based on air-fuel ratio of exhaust entering the LNT and the air-fuel ratio of exhaust exiting the LNT may be compared to a threshold. As such, each of a first air-fuel ratio upstream of the first LNT and a second air-fuel ratio downstream of the first LNT may be evaluated during the richer than stoichiometric regeneration of the first LNT; each of a third air-fuel ratio upstream of the second LNT and a fourth air-fuel ratio downstream of the second the LNT may be evaluated during the richer than stoichiometric regeneration of the second LNT. Further, each of a first relative air-fuel ratio based on each of the first air-fuel ratio upstream of the first LNT and the second air-fuel ratio downstream of the first LNT, and a second relative air-fuel ratio based on each of the third air-fuel ratio upstream of the second LNT and the fourth air-fuel ratio downstream of the second LNT may be estimated. Each of the first calculated relative air-fuel ratio and the second calculated relative air-fuel ratio may be compared with a predetermined threshold value, and in response to the first calculated relative air-fuel ratio being lower than the predetermined threshold value, degradation of the first LNT may be indicated and in response to the second calculated relative air-fuel ratio being lower than the predetermined threshold value, degradation of the second LNT may be indicated.

In order to further continue the diagnostics of the second LNT, at 616, after completion of regeneration of the second LNT, the amount of oxygen trapped in the second LNT, within a threshold duration, may be determined. In one example, the amount of oxygen trapped in the second LNT may be estimated over a threshold number of engine cycles immediately after the engine cycle at which the regeneration of the second LNT has been completed. When the second LNT is completely functional, once regeneration of the second LNT is completed during leaner than stoichiometric engine operation, oxidants such as the oxygen and NOx present in the exhaust may be adsorbed by the LNT. During the threshold duration, a first amount of oxygen entering the second LNT may be measured via the second exhaust oxygen sensor coupled to the exhaust passage upstream of the second LNT and the second amount of oxygen exiting the second LNT may be measured via the third exhaust oxygen sensor coupled to the exhaust passage downstream of the second LNT. The amount of oxygen trapped in the second LNT may be estimated based on the first amount of oxygen entering the second LNT and the second amount of oxygen exiting the second LNT.

At 618, the routine includes determining if the amount of oxygen trapped in the second LNT during the threshold duration is lower than a threshold amount of oxygen. The threshold amount of oxygen may correspond to the amount of oxygen expected to be trapped in the functional second LNT during the threshold time. In one example, the threshold amount of oxygen may be adjusted based on the current engine operating conditions. As such, the threshold amount of oxygen may increase as the engine is operated with leaner than stoichiometric air-fuel ratio. As the operating exhaust air-fuel ratio gets leaner a higher amount of oxygen enters the second LNT and may be trapped by the second LNT. Also, as the oxygen exiting the first LNT enters the second LNT, the amount of oxygen entering the second LNT may be lower than the amount of oxygen entering the first LNT and therefore, the amount of oxygen stored in the second LNT may be different from the amount of oxygen stored in the first LNT. In one example, the amount of oxygen stored in second LNT may be lower than the amount of oxygen stored in the first LNT.

If it is determined that the amount of oxygen trapped in the second LNT is higher than the threshold amount of oxygen, it may be inferred that after regeneration of the second LNT, the second LNT may be operating optimally. Therefore, at 614, it may be indicated that there is no degradation of the second LNT. However, if it is determined that after regeneration of the second LNT, the amount of oxygen trapped at the first LNT is lower than the threshold, at 620, detection of degradation of the second LNT may be indicated. Degradation of the second LNT may be indicated by setting a flag or a diagnostic code, or activating a malfunction indicator lamp in order to notify the vehicle operator that the LNT is degraded and needs to be replaced.

In this way, upon completion of regeneration of the first LNT, a first amount of oxygen stored in the first LNT within a threshold duration immediately after the completion of the regeneration of the first LNT may be estimated, and in response to the first amount of oxygen stored in the first LNT being lower than a first threshold oxygen amount, degradation of the first LNT may be indicated; and upon completion of regeneration of the second LNT, a second amount of oxygen stored in the second LNT within the threshold duration immediately after the completion of the regeneration of the second LNT may be estimated, and in response to the second amount of oxygen stored in the second LNT being lower than a second threshold oxygen amount, degradation of the second LNT may be indicated, the first threshold oxygen amount higher than the second threshold oxygen amount.

In response to the indication of the second LNT, at 622, the controller may adjust the operation of one or more engine actuators to adjust engine operation. In response to the indication of degradation of at least one of the first LNT and the second LNT, one or more engine operating parameters may be adjusted including limiting an engine load to below a threshold engine load by reducing an opening of an intake throttle or any other measure influencing engine load.

In this way, responsive to a first air-fuel ratio upstream of a first lean NOx trap (LNT) being richer than a first threshold, initiating regeneration of the first LNT; and during regeneration of the first LNT and responsive to a second air-fuel ratio upstream of a second LNT being leaner than the first threshold, injecting vaporized reductant to the second LNT, and then regenerating the second LNT. In one example, vaporized reductant may be injected to the second LNT in response to the measured second air-fuel ratio upstream of a second LNT being higher than a threshold air-fuel ratio. During the first LNT regeneration, responsive to a richer than threshold measured second air-fuel ratio, degradation of the first LNT may be indicated.

FIG. 7 shows a graphical representation 700 of lambda signals upstream and downstream of the first LNT (such as first LNT 108 in FIG. 1) during a regeneration when reductant injection is activated, according to an implementation of the present subject matter. The lambda signals are indicative of air-fuel ratios. The graph indicates a plot drawn between the air-fuel ratios (in y-axis) upstream and downstream of the first LNT and time in seconds (in x-axis). The solid line (lower signal) indicates the lambda upstream of the first LNT and the dashed line (higher signal) indicates the lambda downstream of the first LNT. The arrows indicate the delta air-fuel ratio to be compensated by the injector (such as injector 106 in FIG. 1). The exhaust gas of the desired air-fuel ratio received by the first LNT is shown as Lambda upstream of the first LNT. This may lead to release of $NO_x$ trapped inside the first LNT and ultimately lead to release of an exhaust gas of an air-fuel ratio downstream of the first LNT. If the air-fuel ratio of the exhaust gas downstream of the first LNT reduces below a Lambda target (Lambda target indicated by dotted line), the reductant injection is activated. The injection of a vaporized reductant will bring the Lambda downstream of the first LNT in a predefined threshold range. As the reductant is injected in the vaporized state, additional time is not required to vaporize the reductant (such as fuel) before the exhaust reaches the second LNT and NOx purge may commence without delay. Also, since vaporized fuel is injected, liquid fuel may not adhere to the exhaust passage and overall a lower amount of fuel may suffice to attain the desired (richer than stoichiometric) air-fuel ratio.

In this way, by opportunistically adjusting the air-fuel ratio of exhaust entering a second LNT positioned downstream of a first LNT, regeneration and diagnostics of each of the LNTs coupled to the exhaust passage may be carried out concurrently. By concurrently carrying out diagnostics of a plurality of the LNTs, efficiency of the on-board diagnostics may be improved. The technical effect of injecting a vaporized reductant upstream of the second LNT to enable regeneration and diagnostics of the second LNT is that a lower amount of reductant such as fuel may be used to achieve the desired richer than stoichiometric air-fuel ratio of exhaust entering the second LNT. Also, as the reductant is injected in the vaporized state, the delay in initiation of regeneration of the second LNT following the initiation of regeneration of the first LNT may be reduced.

A method for monitoring an engine exhaust after-treatment system, comprises: receiving a first exhaust gas of a desired air-fuel ratio upstream of a first lean NOx trap (LNT); initiating a richer than stoichiometric regeneration of the first LNT for obtaining a second exhaust gas with an air-fuel ratio downstream of the first LNT; evaluating the an air-fuel ratio of the second exhaust gas received downstream of the first LNT; in response to the evaluated air-fuel ratio of the second exhaust gas being higher than the desired air-fuel ratio, activating injection of a vaporized reductant by an injector disposed downstream of the first LNT, to the second exhaust gas for obtaining the desired air-fuel ratio of the second exhaust gas, where the injector is a vaporizer; receiving the second exhaust gas of the desired air-fuel ratio upstream of the second LNT; initiating a richer than stoichiometric regeneration of the second LNT for obtaining a third exhaust gas with an air-fuel ratio downstream of the second LNT; evaluating the an air-fuel ratio of the third exhaust gas received downstream of the second LNT; and determining a working state of each of the first LNT and the second LNT based on each of the desired air-fuel ratio of the first exhaust gas, the evaluated air-fuel ratio of the second exhaust gas, and the evaluated air-fuel ratio of the third exhaust gas. In any preceding example, additionally or optionally, the desired air-fuel ratio of the second exhaust gas is a stoichiometric ratio or an under stoichiometric ratio. In any or all of the preceding examples, additionally or optionally, activating the injection of the vaporized reductant includes adjusting an amount of injected vaporized reductant based on the evaluated air-fuel ratio of the second exhaust gas, the amount increased as the evaluated air-fuel ratio of the second exhaust gas increases above the desired air-fuel ratio. In any preceding example, additionally or optionally, the richer than stoichiometric regeneration of the first LNT is initiated by operating an engine in a richer than stoichiometric fueling condition. In any preceding example, additionally or optionally, determining working state of each of the first and the second LNT comprises: monitoring each of a first amount of oxygen that enters upstream of the first LNT and a second amount of oxygen that exits downstream of the second LNT over a period of time after the richer than stoichiometric regeneration of each of the first and the second LNT; monitoring each of a third amount of oxygen that enters upstream of the first LNT and a fourth amount of oxygen that exits downstream of the second LNT over the period of time; determining each of a fifth amount of oxygen trapped in the first LNT based on each of the first amount of oxygen that enters the first LNT and the second amount of oxygen that exits the first LNT and a sixth amount of oxygen trapped in the second LNT based on each of the third amount of oxygen that enters and the fourth amount of oxygen that exits the second LNT; comparing each of the fifth amount of oxygen and the sixth amount of oxygen with a predetermined threshold value, and in response to the fifth amount of oxygen being lower than the predetermined threshold amount, indicating degradation of the first LNT and in response to the sixth amount of oxygen being lower than the predetermined threshold amount, indicating degradation of the second LNT. In any or all of the preceding examples, additionally or optionally, determining the working state of each of the first and the second LNT further comprises: evaluating each of a first air-fuel ratio upstream of the first LNT and a second air-fuel ratio downstream of the first. LNT during the richer than stoichiometric regeneration of the first LNT; evaluating each of a third air-fuel ratio upstream of the second LNT and a fourth air-fuel ratio downstream of the second the LNT during the richer than stoichiometric regeneration of the second LNT; calculating each of a first relative air-fuel ratio based on each of the first air-fuel ratio upstream of the first LNT and the second air-fuel ratio downstream of the first LNT, and a second relative air-fuel ratio based on each of the third air-fuel ratio upstream of the second LNT and the fourth air-fuel ratio downstream of the second LNT; comparing each of the first calculated relative air-fuel ratio and the second calculated relative air-fuel ratio with a predetermined threshold value, and in response to the first calculated relative air-fuel ratio being lower than the predetermined threshold value, indicating degradation of the first LNT and in response to the second calculated relative air-fuel ratio being lower than the predetermined threshold value, indicating degradation of the second LNT. In any or all of the preceding examples, additionally or optionally, the richer than stoichiometric regeneration of the first LNT is triggered in response to each of a higher than threshold measured exhaust temperature and a lower than threshold space velocity of a catalyst. In any or all of the preceding examples, additionally or optionally, the second LNT is disposed downstream of the first LNT along an engine exhaust passage.

Another example engine method comprises: responsive to a first air-fuel ratio upstream of a first lean NOx trap (LNT) being richer than a first threshold, initiating regeneration of the first LNT; and during regeneration of the first LNT and responsive to a second air-fuel ratio upstream of a second LNT being leaner than the first threshold, injecting vaporized reductant to the second LNT to regenerate the second LNT. Any of the preceding examples further comprising, additionally or optionally, during the first LNT regeneration, responsive to a richer than threshold measured second air-fuel ratio, indicating first LNT degradation and during regeneration of the second LNT, estimating a third air-fuel ratio downstream of the second LNT and responsive to a richer than threshold third air-fuel ratio, indicating degradation of the second LNT. In any preceding example, additionally or optionally, the first exhaust air-fuel ratio is measured via a first oxygen sensor coupled to the exhaust passage upstream of the first LNT, the second exhaust air-fuel ratio is measured via a second oxygen sensor coupled to the exhaust passage upstream of the second LNT, and the third exhaust air-fuel ratio is measured via a third oxygen sensor coupled to the exhaust passage downstream of the second LNT. In any or all of the preceding examples, additionally or optionally, injecting vaporized reductant to the second LNT includes injecting a volume of vaporized reductant to the exhaust gas via a vaporizer coupled to the exhaust passage upstream of the second LNT until the measured second exhaust air-fuel ratio decreases to a threshold air-fuel ratio, the threshold air-fuel ratio richer than stoichiometric. In any or all of the preceding examples, additionally or optionally, the vaporized reductant is fuel, and the volume of vaporized reductant injected is based on the threshold air-fuel ratio, the volume increased as the measured second exhaust air-fuel ratio increase above the threshold air-fuel ratio. In any or all of the preceding examples, additionally or optionally, regenerating the first LNT and regenerating the second LNT are carried out concurrently, the second LNT coupled to the exhaust passage downstream of the first LNT. Any or all of the preceding examples further comprising, additionally or optionally, upon completion of regeneration of the first LNT, estimating a first amount of oxygen stored in the first LNT within a threshold duration immediately after the completion of the regeneration of the first LNT, and in response to the first amount of oxygen stored in the first LNT being lower than a first threshold oxygen amount, indicating degradation of the first LNT; and upon completion of regeneration of the second LNT, estimating a second amount of oxygen stored in the second LNT within the threshold duration immediately after the completion of the regeneration of the second LNT, and in response to the second amount of oxygen stored in the second LNT being lower than a second threshold oxygen amount, indicating degradation of the second LNT, the first threshold oxygen amount higher than the second threshold oxygen amount. Any or all of the preceding examples further comprising, additionally or optionally, in response to the indication of degradation of at least one of the first LNT and the second LNT, adjusting one or more engine operating parameters including limiting an engine load to below a threshold engine load by reducing an opening of an intake throttle.

In yet another example, an engine system comprises: an intake system; an exhaust system including a first lean NOx trap (LNT) coupled to an exhaust passage, a second LNT coupled to the exhaust passage downstream of the first LNT, a first oxygen sensor coupled to the exhaust passage upstream of the first LNT, a second oxygen sensor coupled to the exhaust passage upstream of the second LNT, a third oxygen sensor coupled to the exhaust passage downstream of the second LNT, and a vaporizer coupled to the exhaust passage upstream of the second LNT and downstream of the second oxygen sensor; a turbocharger including a turbine coupled to the exhaust passage, a turbine driven compressor coupled to the intake system, and a waste-gate bypassing the turbine; and a controller with computer readable instructions stored on non-transitory memory for: in response to a sensed first exhaust air-fuel ratio upstream of the first LNT being lower than a stoichiometric air-fuel ratio, regenerating the first LNT, in response to a sensed second exhaust air-fuel ratio downstream of the first LNT being higher than the stoichiometric air-fuel ratio, initiating injection of vaporized fuel to exhaust gas via the vaporizer to decrease the sensed second air-fuel ratio to below the stoichiometric air-fuel ratio, then regenerating the second LNT, and initiating diagnostics of each of the first LNT and the second LNT. In any preceding example, additionally or optionally, the sensed first exhaust air-fuel ratio is sensed via the first oxygen sensor, the sensed second exhaust air-fuel ratio is sensed via the second oxygen sensor, and a sensed third air-fuel ratio sensed downstream of the second LNT is sensed via the third oxygen sensor. In any or all of the preceding examples, additionally or optionally, diagnostics of the first LNT include, comparing the sensed second air-fuel ratio to a threshold, and in response to the sensed second air-fuel ratio being lower than the threshold, indicating degradation of the first LNT, and wherein diagnostics of the second LNT include, comparing the sensed third air-fuel ratio to the threshold, and in response to the sensed third air-fuel ratio being lower than the threshold, indicating degradation of the second LNT. In any or all of the preceding examples, additionally or optionally, the controller contains further instructions for: in response to an indication of degradation of each of the first and the second LNT, opening the wastegate of the turbocharger to reduce boost pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring an engine exhaust aftertreatment system, comprising:
   receiving a first exhaust gas of a desired air-fuel ratio upstream of a first lean $NO_x$ trap (LNT);
   initiating a richer than stoichiometric regeneration of the first LNT for obtaining a second exhaust gas downstream of the first LNT;
   evaluating an air-fuel ratio of the second exhaust gas received downstream of the first LNT;
   in response to the evaluated air-fuel ratio of the second exhaust gas being higher than the desired air-fuel ratio, activating injection of a vaporized reductant by an injector disposed downstream of the first LNT to the second exhaust gas for obtaining the desired air-fuel ratio of the second exhaust gas, where the injector is a vaporizer;
   receiving the second exhaust gas of the desired air-fuel ratio upstream of a second LNT;
   initiating a richer than stoichiometric regeneration of the second LNT for obtaining a third exhaust gas downstream of the second LNT;
   evaluating an air-fuel ratio of the third exhaust gas received downstream of the second LNT; and
   determining a working state of each of the first LNT and the second LNT based on each of the desired air-fuel ratio of the first exhaust gas, the evaluated air-fuel ratio of the second exhaust gas, and the evaluated air-fuel ratio of the third exhaust gas.

2. The method of claim 1, wherein the desired air-fuel ratio of the second exhaust gas is a stoichiometric ratio or an under stoichiometric ratio.

3. The method of claim 1, wherein activating the injection of the vaporized reductant includes adjusting an amount of injected vaporized reductant based on the evaluated air-fuel ratio of the second exhaust gas, the amount increased as the evaluated air-fuel fuel ratio of the second exhaust gas increases above the desired air-fuel ratio.

4. The method of claim 1, wherein the richer than stoichiometric regeneration of the first LNT is initiated by operating an engine in a richer than stoichiometric fueling condition.

5. The method of claim 1, wherein determining the working state of each of the first LNT and the second LNT comprises:
   monitoring each of a first amount of oxygen that enters upstream of the first LNT and a second amount of oxygen that exits downstream of the first LNT over a period of time after the richer than stoichiometric regeneration of each of the first LNT and the second LNT;
   monitoring each of a third amount of oxygen that enters upstream of the second LNT and a fourth amount of oxygen that exits downstream of the second LNT over the period of time;
   determining each of a fifth amount of oxygen trapped in the first LNT based on each of the first amount of oxygen that enters the first LNT and the second amount of oxygen that exits the first LNT and a sixth amount of oxygen trapped in the second LNT based on each of the third amount of oxygen that enters the second LNT and the fourth amount of oxygen that exits the second LNT;
   comparing each of the fifth amount of oxygen and the sixth amount of oxygen with a predetermined threshold value, and
   in response to the fifth amount of oxygen being lower than the predetermined threshold value, indicating degradation of the first LNT, and, in response to the sixth amount of oxygen being lower than the predetermined threshold value, indicating degradation of the second LNT.

6. The method of claim 1, wherein determining the working state of each of the first and the second LNTs further comprises:
   evaluating each of a first air-fuel ratio upstream of the first LNT and a second air-fuel ratio downstream of the first LNT during the richer than stoichiometric regeneration of the first LNT;
   evaluating each of a third air-fuel ratio upstream of the second LNT and a fourth air-fuel ratio downstream of the second the LNT during the richer than stoichiometric regeneration of the second LNT;
   calculating each of a first relative air-fuel ratio based on each of the first air-fuel ratio upstream of the first LNT and the second air-fuel ratio downstream of the first LNT, and a second relative air-fuel ratio based on each of the third air-fuel ratio upstream of the second LNT and the fourth air-fuel ratio downstream of the second LNT;
   comparing each of the first calculated relative air-fuel ratio and the second calculated relative air-fuel ratio with a predetermined threshold value, and
   in response to the first calculated relative air-fuel ratio being lower than the predetermined threshold value, indicating degradation of the first LNT, and, in response to the second calculated relative air-fuel ratio being lower than the predetermined threshold value, indicating degradation of the second LNT.

7. The method of claim 1, wherein the second LNT is disposed downstream of the first LNT along an engine exhaust passage.

8. A method, comprising:
responsive to a first air-fuel ratio upstream of a first lean NOx trap (LNT) being richer than a first threshold, initiating regeneration of the first LNT;
during regeneration of the first LNT and responsive to a second air-fuel ratio upstream of a second LNT being leaner than the first threshold, injecting vaporized reductant to the second LNT to regenerate the second LNT; and
responsive to an indication of degradation of at least one of the first LNT and the second LNT, adjusting one or more engine operating parameters including limiting an engine load to below a threshold engine load by reducing an opening of an intake throttle.

9. The method of claim 8, further comprising, during the first LNT regeneration, responsive to the second air-fuel ratio being richer than a second threshold, indicating degradation of the first LNT, and, during regeneration of the second LNT, estimating a third air-fuel ratio downstream of the second LNT, and, responsive to the third air-fuel ratio being richer than the second threshold, indicating degradation of the second LNT.

10. The method of claim 9, wherein the first air-fuel ratio is measured via a first oxygen sensor coupled to an exhaust passage upstream of the first LNT, the second air-fuel ratio is measured via a second oxygen sensor coupled to the exhaust passage upstream of the second LNT, and the third air-fuel ratio is measured via a third oxygen sensor coupled to the exhaust passage downstream of the second LNT.

11. The method of claim 9, wherein injecting vaporized reductant to the second LNT includes injecting a volume of vaporized reductant to exhaust gas via a vaporizer coupled to an exhaust passage upstream of the second LNT until the second air-fuel ratio decreases to the first threshold, the first threshold richer than stoichiometric air-fuel ratio.

12. The method of claim 11, wherein the vaporized reductant is fuel, and the volume of vaporized reductant injected is based on the first threshold air-fuel ratio, the volume increased as the second exhaust air-fuel ratio increases above the first threshold.

13. The method of claim 9, wherein regenerating the first LNT and regenerating the second LNT are carried out concurrently, the second LNT coupled to an exhaust passage downstream of the first LNT.

14. The method of claim 8, further comprising, upon completion of regeneration of the first LNT, estimating a first amount of oxygen stored in the first LNT within a threshold duration immediately after the completion of the regeneration of the first LNT, and, in response to the first amount of oxygen stored in the first LNT being lower than a first threshold oxygen amount, indicating degradation of the first LNT; and
upon completion of regeneration of the second LNT, estimating a second amount of oxygen stored in the second LNT within the threshold duration immediately after the completion of the regeneration of the second LNT, and, in response to the second amount of oxygen stored in the second LNT being lower than a second threshold oxygen amount, indicating degradation of the second LNT, the first threshold oxygen amount higher than the second threshold oxygen amount.

15. An engine system, comprising:
an intake system;
an exhaust system including a first lean NOx trap (LNT) coupled to an exhaust passage, a second LNT coupled to the exhaust passage downstream of the first LNT, a first oxygen sensor coupled to the exhaust passage upstream of the first LNT, a second oxygen sensor coupled to the exhaust passage upstream of the second LNT, a third oxygen sensor coupled to the exhaust passage downstream of the second LNT, and a vaporizer coupled to the exhaust passage upstream of the second LNT and downstream of the second oxygen sensor; and
a controller with computer readable instructions stored on non-transitory memory for:
in response to a sensed first exhaust air-fuel ratio upstream of the first LNT being lower than a stoichiometric air-fuel ratio, a higher than threshold sensed exhaust temperature or both, regenerating the first LNT, and
in response to a sensed second exhaust air-fuel ratio downstream of the first LNT being higher than the stoichiometric air-fuel ratio, initiating injection of vaporized fuel to exhaust gas via the vaporizer to decrease the sensed second air-fuel ratio to below the stoichiometric air-fuel ratio, then regenerating the second LNT, and initiating diagnostics of each of the first LNT and the second LNT.

16. The system of claim 15, wherein the sensed first exhaust air-fuel ratio is sensed via the first oxygen sensor, the sensed second exhaust air-fuel ratio is sensed via the second oxygen sensor, and a sensed third exhaust air-fuel ratio sensed downstream of the second LNT is sensed via the third oxygen sensor.

17. The system of claim 15, wherein diagnostics of the first LNT include comparing the sensed second exhaust air-fuel ratio to a threshold, and, in response to the sensed exhaust second air-fuel ratio being lower than the threshold, indicating degradation of the first LNT, and wherein diagnostics of the second LNT include comparing the sensed third exhaust air-fuel ratio to the threshold, and, in response to the sensed third air-fuel ratio being lower than the threshold, indicating degradation of the second LNT.

18. The system of claim 17, further comprising a turbocharger including a turbine coupled to the exhaust passage, a turbine-driven compressor coupled to the intake system, and a waste-gate bypassing the turbine, wherein the controller includes further instructions for: in response to an indication of degradation of each of the first LNT and the second LNT, opening the waste-gate of the turbocharger to reduce boost pressure.

* * * * *